US011847875B2

(12) United States Patent
Schwartz et al.

(10) Patent No.: US 11,847,875 B2
(45) Date of Patent: Dec. 19, 2023

(54) SYSTEM AND METHOD OF PROVIDING REMOTE MANAGEMENT OF ACCESS TO A GROUP OF DEVICES

(71) Applicant: BIG BELLY SOLAR LLC, Needham, MA (US)

(72) Inventors: Ethan Matthew Schwartz, Sharon, MA (US); Thomas Richard Olsen, Natick, MA (US); Nisha Khand, Malden, MA (US); Jeffrey Thomas Satwicz, Winchester, MA (US); David John Skocypec, Medfield, MA (US)

(73) Assignee: BIG BELLY LLC, Needham, MA (US)

( * ) Notice: Subject to any disclaimer, the term of this patent is extended or adjusted under 35 U.S.C. 154(b) by 36 days.

(21) Appl. No.: 17/401,920

(22) Filed: Aug. 13, 2021

(65) Prior Publication Data
US 2022/0051500 A1    Feb. 17, 2022

Related U.S. Application Data

(60) Provisional application No. 63/066,471, filed on Aug. 17, 2020, provisional application No. 63/066,474, (Continued)

(51) Int. Cl.
| G07C 9/00 | (2020.01) |
| B65F 1/16 | (2006.01) |
| G07C 9/38 | (2020.01) |
| G07C 9/29 | (2020.01) |
| G06K 7/10 | (2006.01) |
| H04L 67/141 | (2022.01) |
| E05B 49/00 | (2006.01) |

(52) U.S. Cl.
CPC ........ *G07C 9/00571* (2013.01); *B65F 1/1638* (2013.01); *G06K 7/10297* (2013.01); (Continued)

(58) Field of Classification Search
CPC ...... G07C 9/00309; G07C 2009/00769; G07C 2209/63; G07C 9/00571; G07C 9/38; G07C 9/27; H04W 4/023; H04W 12/06; H04W 12/63; H04W 4/08; G06F 21/602; G06K 7/10297; E05B 49/00
See application file for complete search history.

(56) References Cited

U.S. PATENT DOCUMENTS 5,645,215 A      7/1997  Marendt
8,922,333 B1 *  12/2014  Kirkjan .............. G07C 9/00309
                                                            340/5.1
(Continued)

FOREIGN PATENT DOCUMENTS

EP          2835078 A1    2/2015

*Primary Examiner* — Vernal U Brown

(57) ABSTRACT

A system can include a processor and a computer-readable storage device storing instructions which, when executed by the processor, cause the processor to perform operations. The operations can include receiving an identification of a local device having a control module that manages a reader component and a locking mechanism and transmitting an authorized list to the local device that identifies authorized users that can gain access to the local device via the locking mechanism through interacting with the reader component. The control module on the local device can manage multiple functions of the local device including management of the reader component and the locking mechanism.

22 Claims, 13 Drawing Sheets

Related U.S. Application Data filed on Aug. 17, 2020, provisional application No. 63/065,747, filed on Aug. 14, 2020.

(52) U.S. Cl.
CPC ..... *G06K 7/10366* (2013.01); *G07C 9/00722* (2013.01); *G07C 9/29* (2020.01); *G07C 9/38* (2020.01); *H04L 67/141* (2013.01); *E05B 49/00* (2013.01); *G07C 2009/00642* (2013.01)

(56) References Cited

U.S. PATENT DOCUMENTS

| | | | | |
|---|---|---|---|---|
| 8,970,344 | B2* | 3/2015 | Payson | G07C 9/00912 |
| | | | | 340/5.2 |
| 9,894,492 | B1* | 2/2018 | Elangovan | H04W 4/40 |
| 2003/0132829 | A1 | 7/2003 | Frolov | |
| 2004/0243812 | A1 | 12/2004 | Yui | |
| 2007/0182248 | A1* | 8/2007 | Blaker | B60L 8/003 |
| | | | | 307/10.1 |
| 2009/0102653 | A1 | 4/2009 | McGinnis et al. | |
| 2009/0153291 | A1 | 6/2009 | Larson | |
| 2012/0157080 | A1 | 6/2012 | Metivier | |
| 2012/0233687 | A1 | 9/2012 | Metivier | |
| 2013/0087562 | A1 | 4/2013 | Thukral et al. | |
| 2014/0265358 | A1 | 9/2014 | Grillo | |
| 2015/0048625 | A1* | 2/2015 | Weusten | E05B 65/46 |
| | | | | 292/137 |
| 2015/0179006 | A1 | 6/2015 | Von Zurmuehlen | |
| 2015/0307273 | A1 | 10/2015 | Lyman | |
| 2015/0356801 | A1 | 12/2015 | Nitu | |
| 2016/0355308 | A1 | 12/2016 | Poss et al. | |
| 2019/0318559 | A1* | 10/2019 | Pang | G07C 9/27 |
| 2019/0319808 | A1 | 10/2019 | Fallah | |
| 2019/0327448 | A1* | 10/2019 | Fu | G08B 3/10 |
| 2020/0370340 | A1 | 11/2020 | Fetchel Frahm | |

* cited by examiner

SYSTEM AND METHOD OF PROVIDING REMOTE MANAGEMENT OF ACCESS TO A GROUP OF DEVICES

RELATED APPLICATIONS

The present disclosure is related to Provisional Application No. 63/066,474, filed Aug. 17, 2020, and Provisional Application No. 63/065,747, filed Aug. 14, 2020, and Provisional Application No. 63/066,471, filed Aug. 17, 2020 and each of which are incorporated herein by reference.

TECHNICAL FIELD

This disclosure introduces a remote server having a control management component that communicates with a group of devices to manage user authentication and access to each respective device. Each device can be battery-powered and include a control module that manages the operation of the various components and includes within the control module the coding and functionality to manage a locking mechanism by receiving, from the remote server, an authorized list of users who can access the device.

BACKGROUND

Trash containers are distributed in various communities to enable people to dispose of waste. These containers have a number of different structures and different functions. Generally speaking, many trash containers are locked by a locking mechanism that prevents individuals from accessing the trash bin or other internal components configured inside the trash containers. A locking mechanism is typically associated with a door on the trash container. The locking mechanism is often opened by a single key configuration. Keys that are the same can be distributed to people with authority to access the trash container. One problem with this approach is that if any unauthorized individual finds one of the keys, that person can open any trash container as the same key opens up numerous trash containers. Assume an unauthorized person gains access to a trash container. If the trash container is monitoring access to the interior of the unit, it may report access by an individual to a central server. If the access does not involve a maintenance person emptying a trash bin but perhaps the unauthorized person is looking for bottles or cans, the servicing schedule for that trash container can be compromised and can thereby become much less efficient. The data related to the access incident will lead to inaccurate historical data for operation of the particular unit.

In another example, each trash container or a group of trash containers can have respective dedicated unique keys capable of opening the trash container. One problem with this approach is that it increases the complexity of managing and distributing the proper unique key to open a respective trash container.

BRIEF DESCRIPTION OF THE DRAWINGS

In order to describe the manner in which the various advantages and features of the disclosure can be obtained, a more particular description of the principles described above will be rendered by reference to specific embodiments thereof, which are illustrated in the appended drawings. Understanding that these drawings depict only example embodiments of the disclosure and are not to be considered to limit its scope, the principles herein are described and explained with additional specificity and detail through the use of the drawings in which.

DETAILED DESCRIPTION

Figure 1:
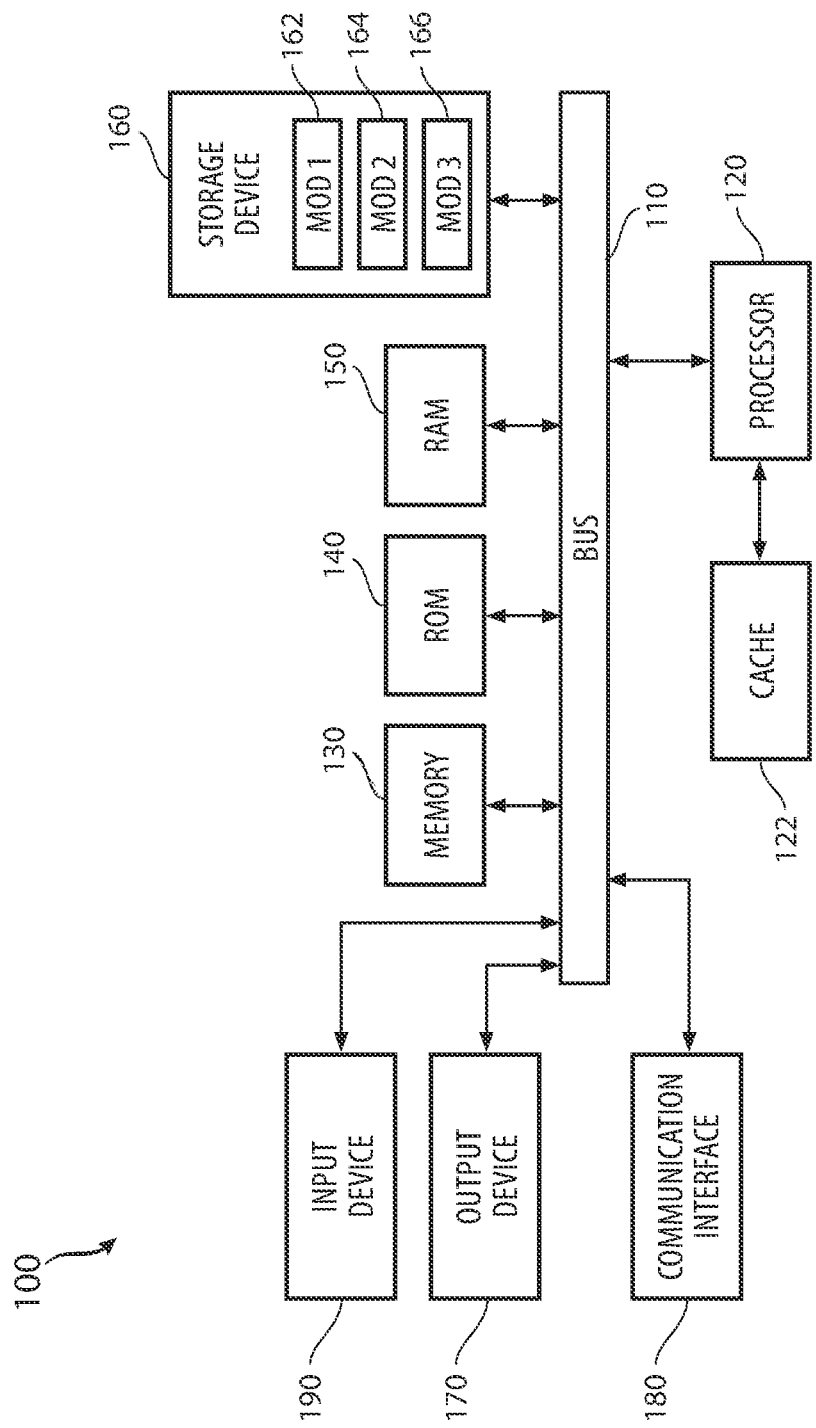
FIG. 1 illustrates an example system embodiment.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Overview

The present disclosure introduces a new system or structure that can be used to enable access to the interior of a trash container, a trash compactor, a storage device, or some other object. Examples provided herein can be in the context of a trash compactor but unless specifically required, such as in a claim, such references are meant to be broader in terms of any container that includes a control module that controls storage device functions and that is programmed to include the locking management functionality. This disclosure provides an improved access control system for servicing and collection of items in a storage container. The solution solves the various problems outlined above related to keys and how they can be used to govern or manage access to the storage containers. Indeed, with the solution provided herein, no physical keys are necessary and the process of managing who is authorized to access a storage device with a mobile phone, RFID card, or other means is simplified.

There are various embodiments or examples shown. Any feature from any example can be mixed with any other feature of an example or embodiment. One aspect disclosed herein covers a single device that communicates with a remote server and that has a control module for managing a locking mechanism on the single device. Various aspects of data communication and locking management are addressed in this first aspect.

Another aspect relates to a plurality of devices and how they work together to control and manage respective locking mechanisms. For example, a pair of devices might include a first device that has a reader and a control module and the second device is "dumb" in that it does not have these hardware components but has its locking operations controlled by the first device. A user can then utilize a device or some kind of input to authenticate themselves with the reader on the first device and one or more of the respective control modules and locking mechanisms on each device of the pair of devices (or three or more devices) can coordinate and unlock any of the devices. In this manner, only one of the devices will need the reader component which reduces the overall cost of the group of devices.

In yet another example disclosed herein, a remote server includes management software for managing a plurality of local devices and/or groups of devices and provides such data as authorization lists, blacklists, master keys, and so forth to centrally manage the locking procedures and operations for individual or groups of devices remotely. These and other ideas are developed herein generally under the theme of managing the locking and unlocking control of devices, including, but not limited, to storage devices and battery-powered devices.

In one example embodiment, a storage device such as a trash compactor can be a solar-powered trash compactor that includes a solar panel, a battery, a control module, and a locking mechanism in connection with a door. The control module in the solar-powered trash compactor controls the operational and functional aspects of the trash compactor. For example, the control module can manage a compaction cycle based on battery power and may shut down some functionality of the trash compactor upon determining that the battery level is below a threshold. As disclosed herein, this disclosure focuses on the locking operation of the storage device and can include, as managed by the control module, also adjusting the locking functionality based on battery power.

The service provided herein with respect to locking control can be enabled on a subscription basis. For example, clients who use storage devices with the access control systems disclosed herein may pay a subscription fee to utilize or activate the access control capability.

In the trash containers described in the Introduction above, the weaknesses in the previous approaches include the locking mechanisms being configured to either be opened or unlocked via a general key which can work on any trash compactor or dedicated key for a respective trash compactor or a group of trash compactors. The locking mechanism is typically mechanical in nature and simply unlocks a door or access panel to the interior of the trash compactor when the appropriate key is used. As noted above, the use of physical keys can be problematic for a number of different reasons. The disclosure herein presents a new locking mechanism and system that includes a locking component that is in electronic communication with the control module of the solar-powered storage device. The locking functions in this disclosure are managed via program code that is added to the existing control module for the solar-powered storage device. Adding locking control functionality to the control module of a solar-powered storage device represents a novel approach to managing access to the interior of the storage device. Previously, the locking mechanism was independent of any control module and fully contained in the mechanical structure of the lock itself.

The new locking mechanism disclosed herein, in one example, can include an electronic component such as a near field communication component or a radio frequency identification component. The locking mechanism is controlled or managed by the control module in the solar-powered storage device. The locking mechanism can include a lock itself and an electronic reader component. The electronic reader component can interact with an RFID (radio-frequency identification) card or a mobile device and thereby receive identification information for the individual that desires to gain access, as instructed by the control module, to the interior of the solar-powered storage device. The control module of the solar-powered storage device can include a listing of individuals that are authorized to gain access to the interior of the solar-powered storage device. Thus, a maintenance person with the appropriate authorization can utilize a mobile phone, an RFID card, bio-metric data such as a fingerprint or faceprint, or some other mechanism to interact with the electronic reader component to cause the locking mechanism to unlock and thus to gain access. The control module of the solar-powered storage device can then confirm whether the individual is authorized to gain access to the interior of the unit. If no, then the electronic locking mechanism does not unlock. If the individual is authorized to gain access, that the electronic locking mechanism unlocks and enables the user to gain access to the interior of the solar-powered storage device.

In another aspect, a magnet can be configured in connection with an access door. The magnet can be configured to hold the door in a closed position even when the electronic locking mechanism is in an unlocked state or unlocked position. The magnet thereby requires the person seeking access to pull on the access door to gain access to the interior. The magnet can prevent accidental opening of the door in case an inadvertent triggering of the electronic locking mechanism occurs, such as when a maintenance person might be walking by the solar-powered trash compactor and their mobile phone is near enough to the electronic locking component to unlock the lock.

In one example, a storage device (such as a solar-powered trash compactor or a battery-powered storage device) can include a processor, a storage bin configured within the storage device, a solar panel (optionally), a battery that stores energy, a sensor component that senses items in the storage bin, an electronic locking mechanism that enables access to an interior portion of the storage device and a control module in control communication with the electronic locking mechanism. The control module, when executed by the processor as powered by the battery or when providing instructions to the processor, manages the sensor component and is in communication with the electronic locking mechanism. The electronic locking mechanism can be powered by the battery. A reader component can be in communication with the control module. The reader component can be powered by the battery and can communicate with or receive signals or data from an external entity to obtain authorization to unlock the storage device via the electronic locking mechanism.

The system can track each user's access and store the information locally and then transmit the information to a central or network-based server to coordinate, aggregate and/or report such data.

In one aspect, the storage device can include a processor, a storage bin configured within the storage device, a battery that stores energy for operation of the storage device, a sensing component that determines a fullness level of the storage bin or some other characteristic of the storage bin and an electronic locking mechanism that enables access to an interior portion of the device. A control module can have instructions (stored in a memory) which, when executed by the processor, manages various functions operational in the storage device including the sensing component. The control module can be in communication with the electronic locking mechanism. A reader component can communicate with an external entity to obtain access authorization request information. The control module can allow or deny access to the device based on stored authorization allowances or an authorized list of users obtained from a remote server.

An example method can include receiving identification information via an external entity from a reader component on a battery-powered storage device. The reader component can be connected to a control module that manages compaction using a compactor component or some other component in the battery-powered storage device and the control module can control an electronic locking mechanism. Based on the identification information, via the control module, the method can include unlocking the electronic locking mechanism in the battery-powered storage device.

In another example, a group of two or more devices can be in communication with each other to enable an authorization step and an unlocking step to occur within the group but not necessarily all on the same device. One of the devices can include a reader component and a control module having unlocking and locking functionality. The other device or devices in a group may not have a reader component or the control module having the locking and unlocking control functions and take instructions from the device having these components.

A pair of devices can include a first device and a second device that communicate lock control signals. The first device can have both a reader component and a control module that controls both (1) a first operation of the first device (such as a sensor control or compaction control) and (2) a first locking component of the first device for accessing a first door of the first device. A second device can be in communication with the first device. The second device can have a second locking component for the second device for accessing a second door of the second device. The second device in one aspect does not having a reader component.

The devices can be storage devices, mailboxes, lamp posts, solar-powered devices, trash compactors, or a combination of different types of devices. In another example related to a pair of compaction devices, the pair of devices can include a first storage device having a first solar panel, a first battery connected to the first solar panel, a first control module powered by the first battery, a first compaction component controlled by the first control module and powered by the first battery, a first electronic locking mechanism and a first reader component and a second storage device. The second storage device can include a second solar panel, a second battery connected to the second solar panel, a second control module powered by the second battery, a second compaction component controlled by the second control module and powered by the second battery, a second electronic locking mechanism and a second reader component. The first control module can be in communication with the second control module. One of the first reader component or the second reader component can enable one or both the first electronic locking mechanism and the second electronic locking mechanism.

An example of a central or remote control system for managing locking operations for a plurality of local devices can be as follows. A system can include a processor and a computer-readable storage device storing instructions which, when executed by the processor, cause the processor to perform operations. The operations can include receiving an identification of a local device having a control module that manages a reader component and a locking mechanism and transmitting an authorized list to the local device that identifies authorized users that can gain access to the local device via the locking mechanism through interacting with the reader component. The control module on the local device can manage multiple functions of the local device including management of the reader component and the locking mechanism. The system can also remotely control and manage authorizations to access groups of devices in which one device in a respective group includes the necessary hardware components and control module functionality to enable a user to be authenticated by interacting with one device in the group but have access to unlock a door on any of the devices in the group.

Detailed Description

This disclosure now provides more details with respect to the locking system for storage devices as disclosed herein. While solar-powered trash compactors are discussed as an example device, other solar-powered or battery-powered storage devices could also have the electronic locking mechanism connected to a control module. For example, a FedEx® package device that stores packages to be picked up and delivered by a carrier can be solar-powered and include a control module that can be upgraded to include locking control functionality. Mailboxes or other storage containers can also be updated to include the concepts disclosed herein. Other devices could include the locking functionality as well, such as safes, vehicles, buildings, and so forth. Therefore, unless specifically required, any reference to a solar-powered trash compactor, a storage device, storage device, a battery-powered device, or other term is meant to have the broader interpretation to encompass systems beyond just solar-powered trash compactors. The system disclosed improves the ability to control access authorization for individuals who can unlock a storage device and gain access to the interior for various purposes. The disclosure now turns to FIG. 1.

With reference to FIG. 1, an exemplary system and/or computing device 100 includes a processing unit (CPU or processor) 120 and a system bus 110 that couples various system components including the system memory 130 such as read only memory (ROM) 140 and random access memory (RAM) 150 to the processor 120. The computer components disclosed in FIG. 1 can be used in connection with any device, control system, control module, locking system or any other computer-related component disclosed herein in connection with the functional control of a storage device or access to other devices, buildings, and so forth. The system 100 can include a cache 122 of high-speed memory connected directly with, in close proximity to, or integrated as part of the processor 120. The system 100 copies data from the memory 130 and/or the storage device 160 to the cache 122 for quick access by the processor 120.

In this way, the cache provides a performance boost that avoids processor 120 delays while waiting for data. These and other modules can control or be configured to control the processor 120 to perform various operations or actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the processor. The processor 120 may be a self-contained computing system, containing multiple cores or processors, a bus, memory controller, cache, etc. A multi-core processor may be symmetric or asymmetric. The processor 120 can include multiple processors, such as a system having multiple, physically separate processors in different sockets, or a system having multiple processor cores on a single physical chip. Similarly, the processor 120 can include multiple distributed processors located in multiple separate computing devices, but working together such as via a communications network. Multiple processors or processor cores can share resources such as memory 130 or the cache 122, or can operate using independent resources. The processor 120 can include one or more of a state machine, an application specific integrated circuit (ASIC), or a programmable gate array (PGA) including a field PGA.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 160 can include software modules 162, 164, 166 for controlling the processor 120. The system 100 can include other hardware or software modules. The storage device 160 is connected to the system bus 110 by a drive interface. The drives and the associated computer-readable storage devices provide nonvolatile storage of computer-readable instructions, data structures, program modules and other data for the computing device 100. In one aspect, a hardware module that performs a particular function includes the software component stored in a tangible computer-readable storage device in connection with the necessary hardware components, such as the processor 120, bus 110, display 170, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the device 100 is a small, handheld computing device, a desktop computer, or a computer server. When the processor 120 executes instructions to perform "operations", the processor 120 can perform the operations directly and/or facilitate, direct, or cooperate with another device or component to perform the operations.

Although the exemplary embodiment(s) described herein employs the hard disk 160, other types of computer-readable storage devices which can store data that are accessible by a computer, such as magnetic cassettes, flash memory cards, digital versatile disks (DVDs), cartridges, random access memories (RAMs) 150, read only memory (ROM) 140, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech, RFID card input, fingerprint or faceprint input or any biometric input, near-field communication component, multi-modal input, gesture input, Bluetooth protocol input, multi-modal input sensor, motion sensor input, and so forth. In one example, the input device 190 can include the various devices or components described herein that can be configured on a storage device and that can receive identification information associated with an individual that wants to unlock the storage device.

An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage devices. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored in other computer-readable memory locations.

One or more parts of the example computing device 100, up to and including the entire computing device 100, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 120 can include all types of processors disclosed herein, including a virtual processor. However, when referring to a virtual processor, the processor 120 includes the software components associated with executing the virtual processor in a virtualization layer and underlying hardware necessary to execute the virtualization layer. The system 100 can include a physical or virtual processor 120 that receive instructions stored in a computer-readable storage device, which cause the processor 120 to perform certain operations. When referring to a virtual processor 120, the system also includes the underlying physical hardware executing the virtual processor 120. The computing components disclosed herein can apply to a storage device, a mobile device, a network-based server that manages a fleet of storage devices or other devices for controlling or managing access to respective devices, even of different types.

Figure 2:
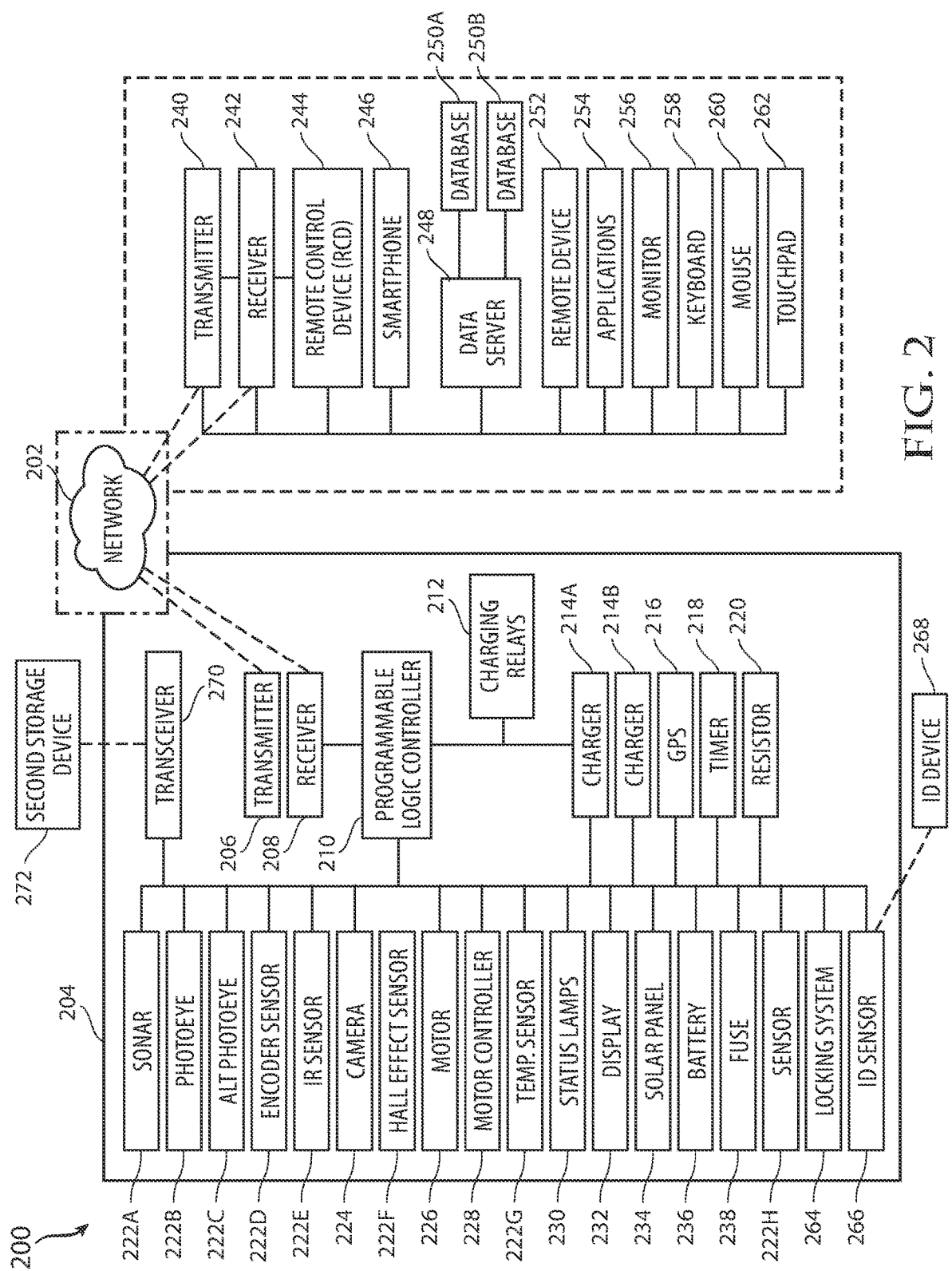
FIG. 2 illustrates an example architecture for remotely controlling electrically-powered compactors or other publically available object.

Having disclosed some components of a computing system, the disclosure now turns to FIG. 2, which illustrates an exemplary architecture for controlling solar-powered storage devices such as trash compactors both locally and remotely via a network. While a number of different functions are disclosed with respect to a storage device 204, this disclosure will focus on the use of the locking system 264 and the ID sensor 266 that can sense or interact with an ID device 268. The locking features will be developed more fully below. Other functionality described in connection with a control system or control module for the device 204 will highlight that the locking mechanism or locking functionality is introduced into the control system or control module 210 of the storage device 204. The control system 210 can control one or more of the other functions of the storage device 204, such as the camera 224 or temperature sensors 222G. In addition to one or more of these other functions, the control system or control module 210 will also include the ability to manage access to the device 204.

The storage device 204 can be a solar-powered storage device for collecting waste, such as trash and recyclables, for example. While a storage device 204 is illustrated, other publicly available objects, such as light posts, stoplights, or other objects can be similarly controlled, powered and locked or unlocked as disclosed herein. As illustrated, the storage device 204 can be, for example, a solar, wind, geo-thermal, or battery-powered device and/or compactor. Preferably, the storage device 204 can recharge while in an inactive state. Moreover, storage device 204 can include a motor 226 for performing various operations, such as compaction operations.

Not shown in the figures is the actual structure for compaction. However, in general, the system in FIG. 2 will include a control system or control module 210 to utilize power in the battery 236 to run a motor 226 that performs compaction on the trash within a bin inside the storage device 204. Further, storage device 204 can be remotely controlled via remote control device (RCD) 244. The RCD can be another node in a mesh network or can be a controlling device accessed via a network 202 which is not a node. To this end, the storage device 204 can include transmitter 206 and receiver 208 for communicating with RCD 244 via the network 202. In particular, transmitter 206 and receiver 208 can communicate with transmitter 240 and receiver 242 on RCD 244, and vice versa. Here, transmitters 206 and 240 can transmit information, and receivers 208 and 242 can receive information, such as control information or a listing of authorized users who can access the storage device 204. Other control information can include a schedule for turning on the locking mechanism. This way, the storage device 204 and RCD 244 can be connected to transmit and receive information, such as instructions, commands, statistics, alerts, notifications, files, software, data, and so forth. The storage device 204 can also communicate with other devices, such as a server and/or a collection vehicle, via transmitter 206 and receiver 208. Similarly, RCD 244 can communicate with other devices, such as a server and/or a user device 246, 252, via transmitter 240 and receiver 242.

Moreover, storage device 204 and RCD 244 can communicate with each other and/or other devices via network 202. The network 202 can include a public network, such as the Internet, but can also include a private or quasi-private network, such as an intranet, a home network, a virtual private network (VPN), a shared collaboration network between separate entities, etc. Indeed, the network 202 can include many types of networks, such as local area networks (LANs), virtual LANs (VLANs), corporate networks, wide area networks, a cell phone transmitter and receiver, a WiFi network, a Bluetooth network, and virtually any other form of network.

In one example, another storage device 272 communicates with the storage device 204. The pair of devices 204, 272 can coordinate the unlocking of one or more of the devices through a person using the ID device 268 that interacts with the ID sensor or reader component 266 on storage device 204. In other words, a kiosk or pairing of two or more storage devices (or any other kinds of devices) can coordinate identifying an individual and unlocking one of the devices in the grouping. Thus, the individual can use ID device 268 for identification by interacting with components of the storage device 204 but it may be the second storage device 272, or another remote device 254 that is unlocked as the devices communicate and coordinate authorization and unlocking functions. One or more control modules 210 on each respect device can communicate authorizations and instructions to each other for performing the identification step or an unlocking step in the process. For example, the ID device 268 can interact with the ID sensor 266 of the storage device 204. The storage device 204 can authorize the individual. The storage device 204 can transmit via the transceiver 270 the authorization data to a second storage device 272. The ID sensor 266 can be positioned anywhere on the storage device 204 where a user can interact with the ID sensor 266 using an ID device 268 as described herein. For example, the ID sensor might be on a top surface of the storage device 204.

Instructions can be provided to unlock the second storage device 272 using the respective locking system of the second storage device 272. Unlocking instructions can be coordinated across control modules of the various storage devices in the grouping or in the pair of storage devices. In one aspect, an application or the user interface can be presented on a user device 268 or on a display 232 which enable the user to select which storage device to unlock or to provide other user interactions with the system to achieve the desired results of the user. In one aspect, the authorization data stored at the storage device 204 can include not only an authorization of the individual but access instructions or restrictions. For example, one user may only be authorized to open the second storage device 272 and not the storage device 204. Thus, individual restrictions can be enforced in this configuration that are not possible when just using a simple key for access.

Transmitter 206 and receiver 208 can be connected to printed circuit board (PCB) which can be part of the control system or control module 210, which controls various functions on device 204. In some embodiments, the RCD 244 can be incorporated within the PCB. In FIG. 2, the RCD 244 is electrically connected to the PCB via transmitters 206, 240 and receivers 208, 242. The RCD 244 can be connected to transmitter 240 and receiver 242 via a two-way communication port, which includes transmitter 240 and receiver 242. The control system or control module 210 can control electrical functions performed by the storage device 204, including those focused on herein which relate to the locking and unlocking of the storage device 204. Electrical functions can include, for example, running compactions by actuating a motor 226; sensing waste or recyclables volume inside the device 204 using a sensor at regular or programmable intervals, such as a sonar-based sensor 222A, a proximity sensor, and/or photoeye sensors 222B-C; changing status lamps 230 at regular and/or programmable thresholds to/from a color indicating that the device 204 is not full (e.g., green), to/from a color indicating that the device 204 is almost full (e.g., yellow), to/from a color indicating that the device 204 is full (e.g., red); operating a locking system 264 and an ID sensor or ID reader 266 which communicates or receives data from an ID device 268. For devices that are not trash compactors, other functionality can be included, such as reports on how many packages are in a bin for a carrier to pick up, or whether to turn a traffic light on or off, or whether to open a door to a building, and so forth.

The ID sensor 266 can also be characterized as an ID reader or reader component that can interact with an ID device 268. The ID device 268 actually represents a number of different identification entities. The ID device 268 can represent a mobile device such as an Apple iPhone or an Android device, a radio frequency identification card (RFID), a fingerprint or a faceprint or other bio-metric input, speech, a voice, a multi-modal input in which different types of input are provided to the ID sensor 266 to obtain authorization, and so forth. The ID sensor 266 will receive the identification information and compare the information to a database or listing of authorized users. The network 202 can provide or download the listing to the storage device 204 of authorized people including specific restrictions for each individual so that local authorization decisions can be made. Upon authorization, the control system or control module 210 can cause a locking system 264 to unlock a door and provide access to the interior of the storage device 204 to the user.

The system can track access on an individual user or identification basis. Such data can be reported by the storage device 204 to a remote device 252 or application 254 that can aggregate the data. For example, a cloud software system can track or record who accessed which device and when. Other sensor data can be transmitted as well to the cloud system for analysis. Such data can also be incorporated into a machine learning algorithm or tracking system that schedules the removal of items from respective storage devices 204. Such systems can be adjusted or modified based on the data received related to unlocking operations. Other data can also be coordinated with unlocking functions. For example, sensor data from a sensor 222H can be coordinated to confirm that trash in a bin within the storage device 204 has been removed in connection with an unlocking operation.

When access is denied to the storage device 204 such as when an unauthorized person tries to access a device, such interaction can also be reported to a network server for analysis.

In one aspect a user can be provided access to specific storage devices within a geographical area or based on some classification (for example, size, quality of service parameter, subscription status, time since last service, device status). Cards can be provided to service people such that they are given proper access to the respective appropriate storage devices. Authorization can also be provided to mobile devices of the users who need access. A mobile device can have a communication protocol that can imitate the signal of an RFID card. The access can then also be changed or modified on an individual basis in the architecture through updates transmitted to respective storage devices.

The storage device 204 can include a transceiver 270 that can enable communication with another storage device 272 as well. The communication can be wired or wireless using any protocol that can achieve the communication. The communication can enable two or more storage devices to coordinate their respective locking systems 264 such that, for example, a user at a group of two or more storage devices 264, 272 can provide their ID 268 once to an ID sensor 266 and have one or more of the grouped storage devices 204, 272 unlocked. The two or more devices 264, 272 can exchange authorization information or data to enable the flexibility of different devices performs different parts of the process to ultimately grant access for a user to one of the devices 264, 272.

The RCD 244 can enable remote control and/or alteration of the functions performed or operated by the control system or control module 210, including placing the device 204 in an active and/or passive state. The RCD 244 can also provide access to, and control over, the various components 206, 208, 210, 212, 214A-B, 216, 218, 220, 222A-H, 224, 226, 228, 230, 232, 234, 236, 238 of the device 204. Users can use a networked device, such as smartphone 246 and/or remote device 252, to communicate with the RCD 244 in order to manage and/or control the device 204. For example, a user can communicate with the RCD 244 via the remote device 252 to change a threshold value on the control system or control module 210, which can control, for example, a collection timing; the compaction motor 226; the use of energy on a lighted advertising display, such as display 232;

the status lamps 230; the sensors 222A-H; the camera 224; unlocking functionality 264, etc. The remote device 252 can include virtually any device with networking capabilities, such as a laptop, a portable media player, a tablet computer, a gaming system, a smartphone, a global positioning system (GPS), a smart television, a desktop, etc. In some embodiments, the remote device 252 can also be in other forms, such as a watch, imaging eyeglasses, an earpiece, etc.

The remote device 252 and RCD 204 can be configured to automatically modify the control system or control module 210 operating parameters. However, users can also manually modify the control system or control module 210 operating parameters via the remote device 252 and RCD 204. The operating parameters can be modified in response to, for example, evolving industry benchmarks; user inputs; historical data, such as the data gathered from a separate database 250A-B; forecasted data, such as upcoming weather characteristics; traffic conditions; a collection schedule; a collection route; a proximity of a collection vehicle; a time and/or date; a location; a capacity, such as a capacity of the device 204 and/or a capacity of a collection vehicle; a fullness state of the device 204; lapsed time between collections; lapsed time between compactions; usage conditions of the device 204; energy usage; battery conditions; statistics; a policy; regulations; a detected movement of an object, such as an object inside or outside of the device 204; collection trends; industry and/or geographical standards; zoning policies and characteristics; real-time information; user preferences; and other data. The data from the remote device 252 can be relayed to the RCD 244, and the data from the RCD 244 can be relayed, via the network 202, to the device 204 and/or the remote device 252 for presentation to the user.

The user can control the RCD 244 and/or access and modify information on the RCD 244 via a user interface, such as a web page, an application 254, a monitor 256, and/or via voice messages and commands, text messages, etc. The remote device 252 can include a user interface, which can display, for example, graphs of collection statistics and trends (e.g., collection frequency, usage, temperature, access history, access trends, access denials, etc.), collection reports, device settings, collection schedules, collection configurations, historical data, status information, collection policies, configuration options, device information, collection routes and information, alerts, etc. This way, users can access information to make educated decisions about how to set and/or reset operating parameters on the control system or control module 210; to control, for example, which sensors are used to gather data, which thresholds to set; to control outputs from the status lamps 230 and other components; to control who accesses a device or the times of device access or other policies, etc. Users can change settings on the device 204, such as optimal collection timing, timing of sensor actuation; and/or modify parameters, such as desired capacity and fullness thresholds; using a scroll down menu, click-and-slide tools, interactive maps displayed on the remote device 252, touch screens, forms, icons, text entries, audio inputs, text inputs, etc. In response, the RCD 244 can automatically reconfigure the control system or control module 210 settings, recalibrate sensors and displays, change operating parameters, change access policies on a device, individual, group of individuals, or group of devices basis, etc.

The RCD 244 can include a two-way communication port that includes transmitter 240 and receiver 242, which can wirelessly communicate with the control system or control module 210 of the device 204, via the transmitter 206 and receiver 208 on the device 204, which are connected electrically to the control system or control module 210. On scheduled and/or programmable intervals, the control system or control module 210 transmitter 206 can send data to a central server, such as data server 248, via the network 202. The same transmitter 206 and receiver 208 can be used to communicate with other nodes (whether devices, benches, or other public objects) in a mesh network. Moreover, the RCD's 244 receiver 242 can be configured to query the data server 248, which can also be connected to the remote device 252, for incoming data. The data server 248 can communicate data from databases 250A-B. If there is no data to be received by the receiver 208, the control system or control module 210 can be configured to promptly return to a low-power mode, where the transmitter 206 and receiver 208 circuits are turned off, until another scheduled, received, initiated, and/or programmed communication event. Such a low-power mode can be the same as an "inactive" mode, or can be distinct from an "inactive" mode because the sensor/transmitter being used are distinct from the transmitter 206 and receiver 208. If there is data to be received by the receiver 208, such as a command to turn the device 204 off and then back on, a command to change the thresholds upon which compactions are operated, a command to change the thresholds for providing status updates and/or determining fullness states, etc., then the RCD receiver 242 can download the new data from the data server 248, via the RCD 244, to the control system or control module 210, altering its operating configuration. The RCD receiver 242 can also be configured to send data to the data server 248 to acknowledge the receipt of data from the control system or control module 210, and to send selected data to the remote device 252, the smartphone 246, and/or any other device, for presentation to a user. Access control functionality can also be adjusted with respect to and one or more of a threshold, a time period a lock is held open, a time period in which a reader component is operational or when a user would be enabled to gain access to the device, and so forth.

The data server 248 can also display the data to a user on remote device 252, smartphone 246, or any other device. The data can be a password-protected web page, a display on the smartphone 246, a display on the monitor 256, etc. Remote control using the RCD 244 to reconfigure operating thresholds, sensor use, sensor hierarchy, energy usage, etc., can enable the device 204 to alter characteristics that control its energy generation, energy consumption, access control policies or parameters, and/or the collection and management logistics, further enabling sound operation of the device 204.

The RCD 244 can be configured to communicate over a wireless network with the control system or control module 210, and transmit data to the data server 248, so the data can be stored for viewing and manipulation by a user via any web-connected computer, phone, or device. The RCD 244 can also be configured to receive data from the data server 248, and transmit the data back to the control system or control module 210. The control system or control module 210 can be electrically connected to a variety of sensors, such as sensors 222A-H, within the device 204. Through the RCD 244, the control system or control module 210 can also be wirelessly connected to the databases 250A-B, and/or other external databases, such as a weather database, which may, for example, reside on a National Oceanographic and Atmospheric (NOAA) server, a database of trucks and locations and schedules, which may reside on a waste hauler's server, a database of traffic conditions, etc. A user can also change which of the sensors 222A-H are used in setting thresholds, among other things, in response to, for example, user commands and/or changes in outside data, such as weather data or truck location data.

The control system or control module 210 can also communicate with a temperature sensor 222G to gather temperature information, which can be transmitted to the RCD 244 via the PCB transmitter 206. The temperature information can be used, among other things, to fine tune operational functions and energy consumption of the device 204. For example, the control system or control module 210 can be reconfigured to run less compaction per day, such as four to eight compactions, in cold weather, since batteries are less powerful in cold weather. Coinciding with cold weather, the winter days are shorter, thus solar energy and battery power is limited. In order to conserve power on low-sunlight days, the RCD 244 can adjust the control system or control module 210 normal fullness sensitivity levels, so that collections are prompted to be made earlier. For example, if the control system or control module 210 typically runs 20 compactions before changing status lamps from green to yellow, a signal that suggests optimal collection time, the RCD 244 can adjust the thresholds of the control system or control module 210 to run 10 compactions before changing from a green state to a yellow state, thus changing the total energy consumption of the compactor between collections. In a busy location, the control system or control module 210 can be configured to sense device fullness every minute, whereas in a less busy location, the control system or control module 210 can be configured to sense fullness once a day.

In some embodiments, the RCD 244 can also alter the timing of events using algorithms based on the results of historical events. For example, the RCD 244 can be initially configured to sense fullness once per minute, but based on resulting readings, it can then alter the timing of future readings. Thus, if three consecutive readings taken at one-minute intervals yield a result of no trash accumulation, the RCD 244 can increase the timing between readings to two minutes, then three minutes, etc., based on the various readings. The RCD 244 can also be configured to adjust sensing intervals based on the level of fullness of the device 204, so it would sense more frequently as the device 204 fills, in order to reduce the margin of error at a critical time, before the device 204 overflows. This "learning feature" can save energy by ultimately synchronizing the sensor readings with actual need to sense. The RCD 244 can also alter thresholds of status lamps 230 based on collection history, the need for capacity as determined by the frequency of red or yellow lights on the device 204, temperatures, expected weather and light conditions, expected usage conditions, etc. The status lamps 230 can be LED lights, for example. Access control can also have various timing elements established and adjusted based on battery level or other factors.

In FIG. 2, the RCD 244 can be enabled, via the control system or control module 210, to read, for example, a temperature sensor 222G; an encoder sensor 222D, which can measure movement of a compaction ram by utilizing an "encoder wheel" which is mounted on a motor shaft; one or more photoeye sensors 222B-C; door sensors; a sensor which measures current from the solar panel and a sensor which can measure current from the battery 236 to the motor 226; a hall effect sensor 222F, which can detect movement of, for example, a door; an infrared (IR) sensor 222E, a camera 224, etc. In addition, the thresholds set by the RCD 244 can be based on historical and real-time information, user preferences, industry norms, weather patterns and forecasts, and other information. The RCD 244 can reset the control system or control module 210 normal thresholds hourly, daily, weekly, monthly, yearly, or at adjustable intervals, based on a variety of information and user decisions.

The RCD 244 can also alter the control system or control module 210 normal hierarchy of sensor usage. For example, if the control system or control module 210 is configured to run a compaction cycle when one or more of the photoeyes 222B-C located inside the device 204 are blocked, the RCD 244 can reconfigure the sensor hierarchy by reconfiguring the control system or control module 210 to run compaction cycles after a certain amount of time has passed, by reading the position of the encoder sensor 222D at the end of a cycle, by reading one or more photoeye sensors 222B-C, by calculating a sensor hierarchy based on historical filling rates, by a change in user preferences, etc. Using an aggregate of data from other devices located worldwide in a variety of settings, the RCD's 244 configurations can depend on constantly evolving parameters for optimizing energy utilization, capacity optimization, and operational behavior, among other things. The RCD 244 innovation and growing database of benchmarks, best practices and solutions to inefficiency, enables the device 204 to adapt and evolve.

Based on the data from the control system or control module 210, the sensors, inputs by the users (e.g., the customer or the manufacturer) via the RCD 244, and/or based on other data, such as historical or weather data, the RCD 244 can change the control system or control module 210 thresholds, operational parameters, and/or configuration, to improve the performance of the device 204 in different geographies or seasons, or based on different user characteristics or changing parameters. Thus, the system and architecture can be self-healing.

The RCD 244 can also be configured to change the control system or control module 210 normal operating parameters. For example, the RCD 244 can be configured to cause the control system or control module 210 to run multiple compaction cycles in a row, to run energy through a resistor 220 to apply a strong load upon the battery 236, which can supply the energy. The RCD 244 can measure battery voltage at predetermined or programmable intervals, to measure the "rebound" of the battery 236. A strong battery will gain voltage quickly (e.g., the battery will almost fully recover within 15 minutes or so). A weak battery will drop significantly in voltage (e.g., 3-5 volts), will recover slowly, or will not recover to a substantial portion of its original voltage. By changing the normal parameters of the control system or control module 210, the battery 236 can be subjected to a heavy load during a test period, which will determine the battery's strength without jeopardizing operations. The RCD 244 can then be configured to relay a message to the user that a battery is needed, or to use the battery differently, for example, by spacing out compactions in time, reducing the degree of voltage decline within a certain time period, shortening the time period in which a lock is held open, establishing short timeframes in which the locking mechanism can be operated, etc. Based on the message and any additional information from the RCD 244, the user can then order a new battery by simply clicking on a button on a web page, for example. The RCD 244 can also alter the control system or control module 210 to do more compactions or other energy-using functions (like downloading software) during the daytime, when solar energy is available to replenish the battery 236 as it uses energy.

Since the RCD 244 can be connected to databases, and can be informed by the control system or control module 210 on each device of conditions or status information at the respective device, the RCD 244 can also be used to relay data collected from the databases or control system or control module 210 for other types of servicing events. In other words, the RCD 244 can obtain, collect, maintain, or analyze status, operating, or conditions information received from the control system or control module 210 of one or more devices and/or one or more databases storing such information, and relay such data to a separate or remote device, such as a remote server or control center. For example, the RCD 244 can be configured to relay a message to a waste hauler to collect the device 204 if two or more parameters are met simultaneously. To illustrate, the RCD 244 can relay a message to a waste hauler to collect the device 204 if the device 204 is over 70% full and a collection truck is within 1 mile of the device 204. Authorization data for the maintenance person in that truck can be downloaded to the device 204 to enable access. In other words, authorization can be more dynamic and related to other parameters such as location-based data for a person who should gain access for a period of time. The access can be provided for a limited time period. The RCD 244 can then send a message to the remote device 252 to alert a user that a collection had been made, and the cost of the collection will be billed to the user's account.

In addition, the RCD 244 can change the circuitry between the solar panel 234 and the battery 236, so that solar strength can be measured and an optimal charging configuration can be selected. The charging circuitry 214A-B is illustrated as two circuitries; however, one of ordinary skill in the art will readily recognize that some embodiments can include more or less circuitries. Charging circuits 214A-B can be designed to be optimized for low light or bright light, and can be switched by the RCD 244 based on programmable or pre-determined thresholds. Also, while solar information can be readily available (e.g., Farmers' Almanac), solar energy at a particular location can vary widely based on the characteristics of the site. For example, light will be weaker if reflected off a black building, and if the building is tall, blocking refracted light. For this reason, it can be useful to measure solar energy on site, as it can be an accurate determinant of actual energy availability at a particular location. To do this, the battery 236 and solar panel 234 can be decoupled using one or more charging relays 212. In other aspects, a very high load can be placed on the battery 236 to diminish its voltage, so that all available current from the solar panel 234 flows through a measureable point. This can be done, for example, by causing the device 204 to run compaction cycles, or by routing electricity through a resistor, or both.

There are a variety of other methods which can be used to create a load. However, putting a load on the battery 236 can cause permanent damage. Thus, the RCD 244 can also be configured to disconnect the battery 236 from the solar panel 234, instead routing electricity through a resistor 220. This can allow for an accurate measurement of solar intensity at a particular location, without depleting the battery 236, which can help assess the potential for running compactions, communicating, powering illuminated advertisements, and powering other operations. In some embodiments, the control system or control module 210 can be reconfigured by the RCD 244 to run continuous compaction cycles for a period of time, measure solar panel charging current, relay the data, and then resume normal operations. Different configurations or combinations of circuits can be used to test solar intensity, battery state or lifecycle, and/or predict solar or battery conditions in the future.

The RCD 244 can also track voltage or light conditions for a period of days, and alter the state of load and charging based on constantly changing input data. For example, the RCD 244 can configure the timer 218 of the control system or control module 210 to turn on the display 232 for advertising for a number of days in a row, starting at a specific time and ending at another specific time. However, if the battery voltage declines over this period of time, the RCD 244 can then reduce the time of the load (the display 232) to every other day, and/or may shorten the time period of the load each day. The locking mechanism can have its parameters adjusted in various ways to reduce the load on the battery 236. Further, the RCD 244 can collect information on usage and weather patterns and reconfigure the control system or control module 210 normal operating regimen to increase or reduce the load (for example, the advertisement on the display 232) placed on the battery 236, based on the information collected. For example, if it is a Saturday, and expected to be a busy shopping day, the RCD 244 can allow a declining state of the battery 236, and can schedule a period in the near future where a smaller load will be placed on the battery 236, by, for example, not running the advertisement on the coming Monday. In doing so, the RCD 244 can optimize the advertising value and energy availability to use energy when it is most valuable, and recharge (use less energy) when it is less valuable. In order to maximize solar energy gained from a variety of locations, the RCD 244 can cause the control system or control module 210 to select between one of several charging circuits. For example, if it is anticipated that cloudy conditions are imminent, the RCD 244 can change the circuit that is used for battery charging, in order to make the charger more sensitive to lower light conditions. In a sunny environment, the charger circuit used can be one with poor low-light sensitivity, which would yield more wattage in direct sunlight.

The architecture 200 can also be used for monitoring functions, which can enable users to access information about the device 204 and collection process. With this information, users can make judgments that facilitate their decision-making, helping them remotely adjust settings on the device 204 to improve performance and communication. For example, the RCD 244 can be configured to enable users to easily adjust callback time, which is the normal time interval for communication that is configured in the control system or control module 210. The RCD 244 can enable the user to alter this time setting, so that the device 204 communicates at shorter or longer intervals. Once the control system or control module 210 initiates communication, other parameters can be reconfigured, such as awake time, which is the amount of time the receiver is in receiving mode. This enables users to make "on the fly" changes. In some cases, the control system or control module 210 can shut down after sending a message and listening for messages to be received. In these cases, it can be difficult to send instructions, wait for a response, send more instructions and wait for a response, because the time lapse between normal communications can be a full day. However, by remotely adjusting the setting through the RCD 244, the user can make continuous adjustments while testing out the downloaded parameters in real time, and/or close to real time. This can enhance the ability of the user to remotely control the device 204.

Further, the RCD 244 can alter the current of the photoeyes 222B-C, in a test to determine whether there is dirt or grime covering the lens. Here, the RCD 244 can reconfigure the normal operating current of the photoeyes 222B-C. If the lens is dirty, the signal emitter photoeye will send and the signal receiver will receive a signal on high power, but not on low power. In this way, a service call can be avoided or delayed by changing the normal operating current to the photoeyes 222B-C. This can be a useful diagnostic tool.

In some embodiments, regular maintenance intervals can be scheduled, but can also be altered via information from the RCD 244. The RCD 244 can be configured to run a cycle while testing motor current. If motor current deviates from a normal range (i.e., 2 amps or so), then a maintenance technician can be scheduled earlier than normal. The RCD 244 can send a message to the user by posting an alert on the users web page associated with the device 204.

Other settings can be embodied in the device 204 as well. For example, the control system or control module 210 can sense that the device 204 is full. The RCD 244 can then configure the control system or control module 210 to have a web page, or another display, present a full signal. The RCD 244 can alter when the full signal should be presented to the user. For example, after accessing a database with historical collection intervals, the RCD 244 can reconfigure the control system or control module 210 to wait for a period of time, e.g., one hour, before displaying a full signal at the web page. This can be helpful because, in some cases, a "false positive" full signal can be signaled by the control system or control module 210, but this can be avoided based on historical information that indicates that a collection only a few minutes after the last collection would be highly aberrational. The RCD 244 can thus be configured to override data from the control system or control module 210. Instead of sending a full signal to the user, the RCD 244 reconfigures the control system or control module 210 to ignore the full signal temporarily, and delay the display of a full-signal on the user's web page or smart phone, in order for time to go by and additional information to be gathered about the device's actual fullness status. For example, when a collection is made and ten minutes later, the fullness sensor detects the device 204 is full, the fullness display message on the web page can be prevented from displaying a full status. In some cases, a plastic bag can be full of air, causing the proximity sensor in the device 204 to detect a full bin. Within a certain time period, e.g., twenty minutes in a busy location, a few hours in a less busy location, as determined based on the historical waste generation rate at the site, the bag can lose its air, and the proximity sensor can sense that the bin is less full than it was twenty minutes prior, which would not be the case if the bin was full with trash instead of air. Thus, "false positive" information can be filtered out.

Likewise, tests and checks can be performed so that false negative information is avoided as well. For example, if a bin regularly fills up daily, and there is no message that it is full after two or three days, an alert can appear on the user's web page indicating an aberration. Thresholds for normal operating parameters and adjustments to normal can be set or reset using the RCD 244, or they can be programmed to evolve through pattern recognition. Although many operating parameter adjustments can be made through the web portal, adjustments can also be made automatically. This can be controlled by a software program that aggregates data and uses patterns in an aggregate of enclosures to alter control system or control module 210 settings on a single enclosure. For example, if the collection data from 1,000 enclosures indicates that collection personnel collect from bins too early 50% of the time when compaction threshold setting is set to "high", compared to 10% of the time when compaction settings are set at "medium," then the RCD 244 can reprogram the compaction thresholds to the medium setting automatically, so that collection personnel can be managed better, limiting the amount of enclosures that are collected prematurely. Automatic reprogramming, governed by software programs, can be applied to other aspects, such as user response to dynamic elements of the device 204, such as lighted or interactive advertising media displayed on the device 204. For example, if users respond to an LCD-displayed advertisement shown on the device 204 for "discounted local coffee" 80% of the time, the RCD 244 can configure all devices within a certain distance, from participating coffee shops, to display the message: "discounted local coffee."

In some embodiments, the RCD 244 can include a data receiving portal for the user with information displays about an aggregate of devices. Here, the user can access real-time and historical information of, for example, devices on a route, and/or devices in a given geography, and/or access control or history. The data can be displayed for the user on a password-protected web page associated with the aggregate of devices within a user group. The device 204 can also display, for example, bin fullness, collections made, the time of collections, battery voltage, motor current, number and time of compaction cycles run, graphs and charts, lists and maps, access control historical information, etc. This data can be viewed in different segments of time and geography in order to assess device and/or fleet status, usage, and/or trends. The user's web page can show, for example, a pie chart showing percentage of bins collected when their LED was blinking yellow, red and green, or a histogram showing these percentages as a function of time. These statistics can be categorized using pull down menus and single-click features. A single click map feature, for example, is where summary data for a particular device is displayed after the user clicks on a dot displayed on a map which represents that device. This can allow the user to easily view and interact with a visual map in an external application.

The RCD 244 can be configured to display calculated data, such as "collection efficiency," which is a comparison of collections made to collections required, as measured by the utilized capacity of the device 204 divided by the total capacity of the device 204 (Collection Efficiency=utilized capacity/total capacity). The user can use this information to increase or decrease collections, increase or decrease the aggregate capacity across an area, etc. Typically, the user's goal is to collect the device 204 when it is full—not before or after. The user can click buttons on their web page to show historical trends, such as collection efficiency over time, vehicle costs, a comparison of vehicle usage in one time period versus vehicle usage in another time period, diversion rates, a comparison of material quantity deposited in a recycling bin versus the quantity of material deposited into a trash bin. Other statistics can be automatically generated and can include carbon dioxide emissions from trucks, which can be highly correlated to vehicle usage. Labor hours can also be highly correlated with vehicle usage, so the web page can display a labor cost statistic automatically using information generated from the vehicle usage monitor. As the user clicks on buttons or otherwise makes commands in their web portal, the RCD 244 can change the PCB control system or control module 210 operating parameters, usage of sensors, unlocking functionality, etc., and/or measurement thresholds in response. The RCD 244 can also be configured to automatically display suggested alterations to the fleet, such as suggestions to move devices to a new position, to increase or decrease the quantity of devices in a given area, to recommend a new size device based on its programmed thresholds, resulting in an improvement in costs to service the fleet of devices.

Heat mapping can also be used to provide a graphical representation of data for a user. Heat mapping can show the user the level of capacity in each part of an area, for example a city block, or it can be used to show collection frequency in an area. In each case, the heat map can be generated by associating different colors with different values of data in a cross sectional, comparative data set, including data from a plurality of enclosures. The heat map can be a graphical representation of comparative data sets. In some embodiments, red can be associated with a high number of a given characteristic, and "cooler" colors, like orange, yellow and blue, can be used to depict areas with less of a given characteristic. For example, a heat map showing collection frequency or compaction frequency across 500 devices can be useful to determine areas where capacity is lacking in the aggregate of enclosures a relative measure of capacity. In this case, the highest frequency device can be assigned a value of red. Each number can be assigned progressively cooler colors. In other embodiments, the red value can be associated with a deviation from the average or median, for example, a darker red for each standard deviation. The heat maps can be shown as a visual aid on the user's web page and can color-code regions where "bottlenecks" restrict vehicle and labor efficiency. A small red region can show graphically, for example, that if the user were to replace only ten devices with higher-capacity compactors, the collection frequency to a larger area could be reduced, saving travel time. Heat maps can be a helpful visual tool for showing data including, but not limited to, data showing "most collections" in a given time period, "most green collections," which can visually demonstrate the number of bins collected too early (before they are actually full), "most compactions," which can show on a more granular level the usage level of the bin, "most uses," which can represent how many times the insertion door of the bin is opened or utilized, "most alerts," which can show visually the number of "door open alerts," which can show when doors were not closed properly, "voltage alerts," which can show visually which devices are of low power, etc. While specific measurements are described herein to demonstrate the usefulness of heat mapping, there are other sets of data that can be represented by the heat maps, which are within the scope and spirit of this disclosure.

The heat map can also be used to present a population density in one or more areas, as well as a representation of any other activity or characteristic of the area, such as current traffic or congestion, for example. This information can also be shared with other businesses or devices. For example, the RCD 244 can analyze the heat map and share population statistics or activity with nearby businesses or municipalities. The RCD 244 can, for example, determine a high population density in Area A on Saturday mornings and transmit that information to a nearby locale to help the nearby locale prepare for the additional activity. As another example, if the device is placed in a park, the RCD 244 can determine population and activity levels at specific times and alert park officials of the expected high levels of activity so the park officials and/or those managing the device can plan accordingly.

The RCD 244 can also be used for dynamic vehicle routing and compaction and/or device management. Because the RCD 244 can be a two-way communicator, it can both send and receive information between various devices and databases, using a mesh network. This can allow the user to cross-correlate data between the fleet of devices and the fleet of collection vehicles. The RCD 244 can receive data from the user and/or the user's vehicle. For example, the RCD 244 can receive GPS data or availability data and use it to change parameters on a given device or aggregate of devices. The RCD 244 can receive this data from the user's GPS-enabled smartphone, for example. Similarly, the RCD 244 can send data to the user, a user device, a smartphone, etc., about the status of the device 204. With this two-way data stream, collection optimization can be calculated in real time or close to real time. For example, a collection truck is traveling to the east side of a city and has 30 minutes of spare time. The RCD 244 can receive information about the truck's whereabouts, availability and direction, and query a database for device real time and historical fullness information and determine that the truck can accommodate collections of twenty device locations. The RCD 244 can then display a list of twenty device locations that the truck can accommodate. The user can view a map of the twenty recommended locations, see a list of driving directions, etc. The map of driving directions can be optimized by adding other input data, such as traffic lights, traffic conditions, average speed along each route, etc. At the same time, as the truck heads to the east side of the city, the RCD 244 can reconfigure devices on the west side to change compaction thresholds, so that capacity is temporarily increased, freeing up additional time for the truck to spend in the east section. Alternatively, the RCD 244 can reconfigure a device to temporarily display a "full" message to pedestrians, helping them find a nearby device with capacity remaining. The RCD 244 can, in the case where the device requires payment, increase pricing to the almost-full device, reducing demand by pedestrians or other users. This same logic can be effective in situations where trucks are not used, for example, indoors at a mall or airport. The demand for waste capacity can vary, so having remote control over the device 204 can allow users to change settings, parameters, and/or prices to make the collection of waste dynamic and efficient.

The location of the device 204 and other devices can be determined via triangulation and/or GPS, for example, and placed on a map in the interactive mapping features. Moreover, the location of an indoor device can be obtained from indoor WiFi hot spots, and the indoor device can be placed on a map in the interactive mapping features. As a staff member accomplishes tasks (i.e., cleaning a bathroom) and moves inside a facility, the staff member's location can be tracked, and the fullness and location of nearby devices can be plotted on a map or given to the staff member by other means, as instructions to add a collection activity to the list of tasks. Whether by GPS, Wifi, Bluetooth, etc., triangulation between communication nodes can serve to locate a device on a map, and measurements of fullness of devices can be used to create work instructions for staff members or truck drivers, so that efficient routes and schedules can be created to save time.

To better manage the collection process, user groups can be separated between trash and recycling personnel. In many cities, there are separate trucks used to collect separate streams of waste, such as trash and recyclables. For this reason, it can be helpful to configure the user's web page to display data based on a waste stream. The data can also be divided in this fashion and displayed differently on a smartphone, hand-held computer, and/or other user device. In addition, data can be displayed differently to different users. For example, the manager of an operation can have "administrative privileges," and thus can change the location of a particular device in the system, view collection efficiency of a particular waste collector, view login history, and/or view industry or subgroup benchmarks, while a waste collector with lower privileges can only view device fullness, for example. The RCD 244 or another device can also be configured to print a list of devices to collect next, a list of full or partially full bins, etc. For example, the remote device 252 can be configured to print a list of devices to collect in the remaining portion of a route.

Figure 3:
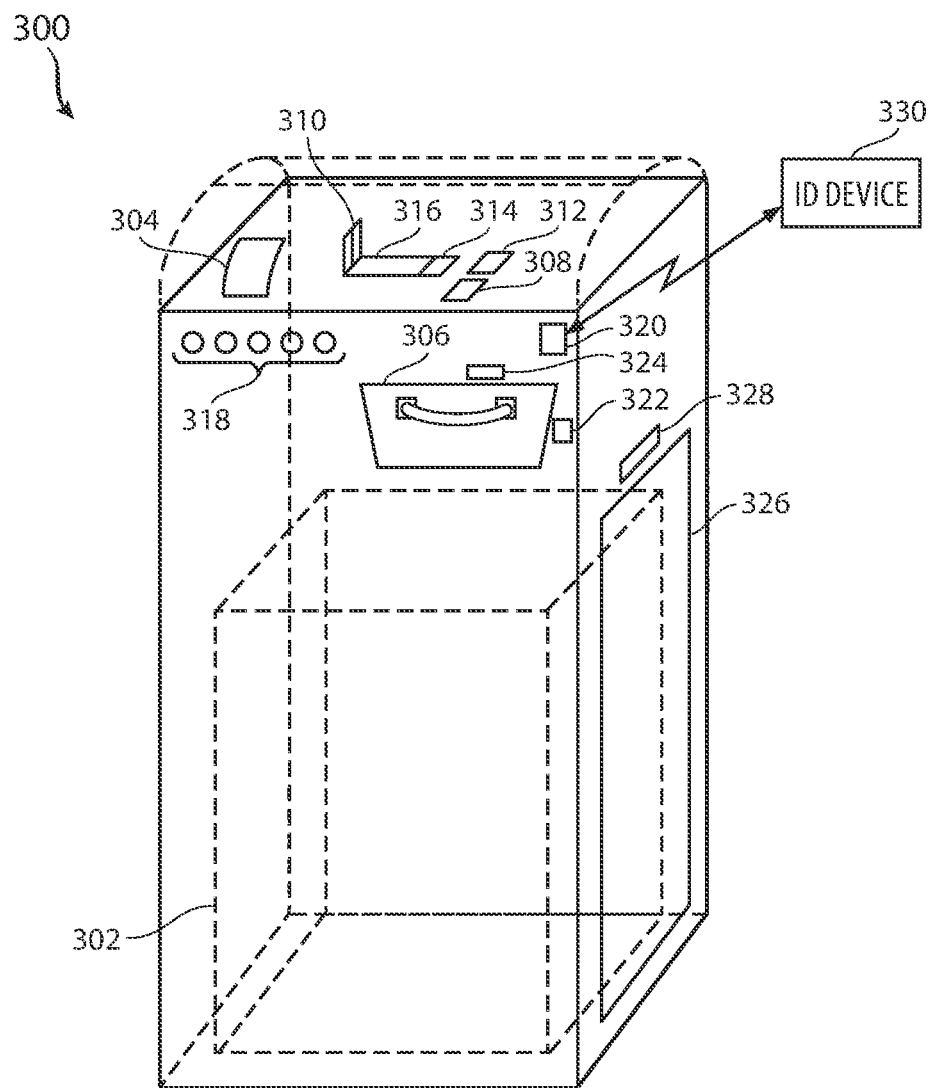
FIG. 3 illustrates an example storage device.

The disclosure now turns to FIG. 3, which illustrates an exemplary storage device 300. The storage device 300 can be configured to dynamically adjust sensors and compaction operations, as further described below.

The storage device 300 includes a bin 302 for storing content items, and a door 306 for opening the storage device 300 to throw or deposit items in the bin 302. An ID sensor or reader component 320 can be provided which enables a user to provide identification via the ID device 330 to the storage device 300. For example, an RFID card, a mobile phone through near-field communication, a biometric input such as a fingerprint or a faceprint, and so forth. A control module (not shown) is configured within the storage device 300 and includes a listing as provided by a remote server of authorized individuals who can enter the storage device 300. A locking mechanism 322 is in communication with the control module and the reader component 320 and will unlock the locking mechanism 322 for a predetermined period of time. For example, the locking mechanism 322 may be open for 3-6 seconds. After the period of time, the locking mechanism 322 returns to a locked state or locked position. A magnet 324 can be configured to hold the door 306 closed in case the unlock request was inadvertent. The door 306 and other locking components can be configured at any location on the storage device 300. For example, the door 306 may be configured on a side wall, front wall or rear wall. The locking mechanism 322 may enable the user to open up a top portion of the storage device 300 to gain access to the interior. The particular structure of the door 306 is not critical to the concepts disclosed herein. For example, an alternate door 326 is shown on the side with a magnet 328 used to prevent the door from swinging open upon the door 326 being unlocked by a locking mechanism 322.

In addition, each of the sensor modules can include an emitter and receiver. Moreover, the storage device 300 can include compactor software or firmware configured to run self-diagnostics on each of the sensor modules and the normal paths, to ensure the storage device 300 is running properly and to report any errors to the management console.

In some configurations, the storage device 300 can also include a sonar sensor 308 to detect objects in the device 300 and calculate the fullness state of the device 300. The signal transmitted and sensed in order to determine trash levels can be any frequency (IR, visual range, etc.) and at any pulse rate. Further, any number and combination of sensors, transmitters, and receivers could be applied in various places within the device 300. The storage device 300 can also include other types of sensors 304, such as an infrared sensor, a temperature sensor, a hall effect sensor, an encoder sensor, a motion sensor, a proximity sensor, reader component 320, etc. The sonar sensor 308 and sensors 304 can sense fullness at regular intervals, and/or based on manual inputs and/or a pre-programmed schedule, for example. Moreover, the sonar sensor 308 and sensors 304 are electrically connected to the printed circuit board (PCB), control system or control module 316. Further, the sonar sensor 308 and sensor 304, locking mechanism 322 and reader component 320 can be actuated, powered and/or controlled by the control system or control module 316, which can be configured to control the various operations of the storage device 300.

The control system or control module 316 can control electrical functions performed by the storage device 300. The electrical functions controlled by the control system or control module 316 can include, for example, running compactions by actuating a motor; sensing waste or recyclables volume inside the device 300 using a sensor at regular or programmable intervals, such as sensors 304; changing status lamps 318 at regular and/or programmable thresholds to/from a color indicating that the device 300 is not full (e.g., green), to/from a color indicating that the device 300 is almost full (e.g., yellow), to/from a color indicating that the device 300 is full (e.g., red); collecting data and transmitting the data to another device; receiving data from another device; managing a power mode; measuring and managing a current; performing diagnostics tests; managing a power source; controlling access to the storage device 300 via the reader component 320 and the locking mechanism 322, etc. The motor controller 310 can enable voltage to be applied across a load in either direction. The control system or control module 316 can use the motor controller 310 to enable a DC motor in the device 300 to run forwards and backwards, to speed or slow, to "brake" the motor, etc.

The storage device 300 includes a transmitter 312 and a receiver 314 for sending and receiving data to and from other devices, such as a server or a remote control device. Accordingly, the storage device 300 can transmit and receive information such as instructions, commands, statistics, alerts, notifications, files, software, data, and so forth. The transmitter 312 and receiver 314 can be electrically connected to the control system or control module 316. This way, the transmitter 312 can transmit data from the control system or control module 316 to other devices, and the receiver 314 can receive data from other devices and pass the data for use by the PCB 316. In this regard, a user who is checking the status of the device could drive down the street near the device (say within a wireless range, such as Bluetooth or WIFI, for example), not even get out of their vehicle, but receive a signal indicating that all is well, that the trash needs to be emptied, or that a repair or cleaning is needed. Authorization information can also be provided such that the person receiving the notice is already authorized to unlock the storage device 300 and to just use their mobile phone on a near-field communication reader 320.

Status lamps 318 can provide an indication of the status of the storage device 300. For example, the status lamps 318 can indicate the fullness state of the storage device 300. To this end, the status lamps 318 can be configured to display a respective color or pattern when the storage device 300 is full, almost full, not full, etc. For example, the status lamps 318 can be configured to flash red when the storage device 300 is full, yellow when the storage device 300 is almost full, and green when the storage device 300 is not full. Moreover, the status lamps 318 can be LED lights, for example.

The status lamps 318 can also be configured to flash in various patterns to indicate various other conditions. For example, the status lamps 318 can be configured to flash at the same time and in combination to show that the device 300 is full. The status lamps 318 can also be configured to flash in different patterns or times or colors to show troubleshooting status information for example. In some cases, the status lamps 318 can be configured to flash in a predetermined manner to show that a door of the device is open, a component is damaged, an obstacle is stuck, an operation is currently active, etc. A display could also show the name of a person authorized to open the door 306/326 or other locking instructions or information.

As one of ordinary skill in the art will readily recognize, the device 300 can include other components, such as motors, sensors, batteries, solar panels, displays, relays, chargers, GPS devices, timers, fuses, resistors, remote control devices, cameras, etc. However, for the sake of clarity, the device 300 is illustrated without some of these components.

In some configurations, the storage device 300 can be configured to implement dirt-sensing technology. The dirt sensing technology can use firmware or other software instructions to monitor the signals, such as infra-red signals, through the sensors on the device 300, and use this data to determine how dirty the detection sensors have become. For example, in some cases, a "clean" sensor 304D can take around six 38 kHz pulses transmitted from a transmitter 304C before the signal is detected. As the sensor becomes more and more dirty it typically takes longer to detect the signal, and may even take twenty 38 kHz pulses, for example. This data can be used to provide a scale of how dirty the sensor has become and provide feedback to the user before the sensor becomes completely blocked. Once the sensor is blocked, the capacity of the compactor can be reduced since compactions may no longer performed. As one of ordinary skill in the art will readily recognize, the frequencies and number of pulses discussed herein are provided for non-limiting illustration purposes. In fact, the frequencies used and number of pulses associated with specific dirt levels can vary based on a number of factors, such as hardware and preference settings. Moreover, other applications, frequencies and number of pulses are contemplated herein.

Furthermore, since the voltage of a battery does not generally indicate the actual capacity in a battery, it can be beneficial to understand what capacity is available to ensure accurate machine operation and dead battery notification. To this end, the machine firmware can analyze voltage drops that occur after a compaction occurs at what current, and can determine a ratio which can provide feedback and indications of the true battery capacity. The machine firmware can also analyze how fast voltage is dropping based on current wireless usage and predict when an alternative node in the mesh network, and particularly the paired node, should be switched to. For example, if the machine firmware detects that the system will have sufficient capacity for 3 hours of work in 20 minutes, the system can configure a switch between nodes to take place in 20 minutes. If the system calculates the other node, in an active state, will reach a critical power level in 15 minutes, the system can cause a transfer to an active state take place sooner than might otherwise have occurred so that coverage continues. The firmware can use a ratio to limit compactions, sensor activity, wireless/cellular activity, and/or notify the management console of the battery state. As previously mentioned, the management console can be a console on the actual storage device 300 and/or a remote device, such as a server, for example.

Figure 4:
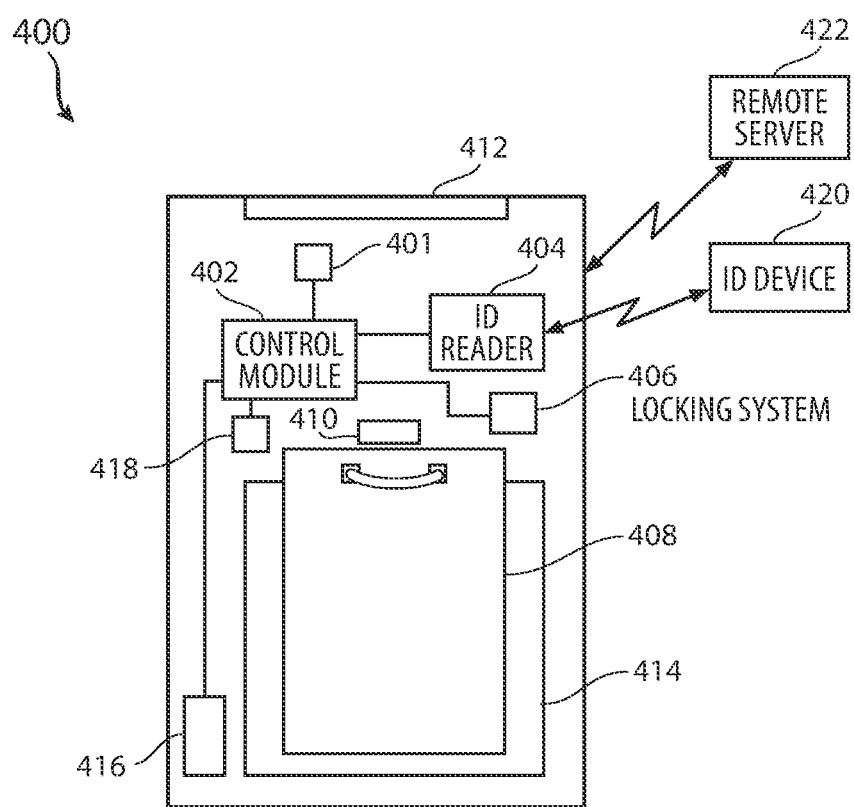
FIG. 4 illustrates the locking system of a storage device.

FIG. 4 illustrates another example of a storage device 400 that includes a processor 401, a storage bin 414 configured within the storage device 400, a solar panel 412, a battery 416 that stores energy from the solar panel 412, a compaction component 418 that compacts items in the storage bin 414, a lock mechanism 406 which enables access to an interior portion of the storage device 400, a control module 402 which, when executed by the processor as powered by the battery 416, manages the compaction component 418 and is in communication with the lock mechanism 406 and a reader component 404 that is in communication with the control module 402. The reader component 404 communicates with an external entity 420 (such as a mobile phone, an RFID card, a bio-metric input, speech input, gesture input, multi-modal input, etc.) to obtain authorization to unlock the storage device 400 via the lock mechanism 406. In one aspect, an application has been downloaded on the mobile device 420 of the user and that includes user interfaces and functionality used to interact with the reader component 404. The reader component 404 can include one of an RFID reader, a near-field communication component, a Bluetooth reader component, a gesture sensing or detecting component, a facial recognition component, a bio-metric reader, a touch-sensitive display, a keypad, a multi-modal input component and a motion detection component. Upon triggering the locking mechanism 406, the control module 402 can maintain the lock component 406 in an unlock position for a predetermined period of time, after which the lock component 406 locks or changes to a locked position or state to prevent a door 408 from being opened by a user.

When the reader component 404 communicates with the external entity 420 to obtain authorization to unlock the storage device 400, the control module 402 can obtain identification data associated with the external entity 420 and report at least the identification data to a remote server 422. The storage device can further include a magnet 410 and a door 408. The magnet 410 can be configured to hold the door 408 closed upon the lock mechanism 406 unlocking the door 408. In this manner, the door 408 would not swing open upon an accidental unlocking of the storage device 400.

The external entity 420 can be authorized to unlock the storage device 400 on one or more of an individual station level, a group of stations level, a customer level, an individual person level, or a multiple customer level. In one aspect, the control module 402 stores a listing on the storage device 400 of authorized external entities that can unlock the storage device 400. The listing stored in the storage device 400 can be updated based upon a communication between the storage device 400 and the remote server 422. In this manner, the unlocking capability and authorization can be instantaneous (handled locally at the storage device 400) rather than requiring a network communication confirmation from a remote device 252.

The control module 402, upon initial setup of the storage device 400, can enable unlocking of the lock mechanism 406 upon the reader component 404 reading a disposable external entity 420 that can include, for example, an ID card shipped with the storage device 400. In this manner, upon initiating the storage device 400 with the disposable external entity 420, the storage device 400 can communicate with the remote server 422 and receive the listing of authorized external entities that can unlock the storage device 400. The system can be shipped with a battery that is disconnected such that the lock would not work. A plastic shim can be used or wedged into the locking mechanism such that it is prevented from locking upon initial setup. Once the battery is connected and the locking mechanism is active, the disposable ID card can be used to unlock the system and initiate the downloading of the authorized access list. In one aspect, in this initiation mode, prior to the first access control list being downloaded, only the disposable external entity 420 or any ID card could be used to unlock the system. Once the authorized user list is downloaded, then the disposable external entity 420 no longer would have access after the initialization. The control module, upon initial setup of the storage device and before communication between the storage device and the remote server, can enable unlocking of the electronic locking mechanism upon the reader component interacting with any external entity of any acceptable format, regardless of specific ID information. In this manner, the device will always be unlockable at initial setup until the unit can communicate with the remote server and receive and store an authorized list of users or entities.

In another aspect, a master ID entity could be used to open any storage device. Such information or access control can be stored in the control module or a memory of the device.

The control module 402 can store instructions to adjust a temporary period of time, based on a battery power level, that a door 408 is unlocked upon triggering the lock mechanism 404. Holding the locking mechanism 404 in the unlocked position takes battery power. The control module 402 can cause the electronic locking mechanism 404 to function below a compaction shut off voltage defined in the control module 402. For example, the control module 402 can cause the compaction component to shut off because the battery level is too low. However, the control module 402 can be programmed to cause the electronic locking mechanism 404 and the associated reader component 404 to remain operational as long as possible. The control module 402 can cause the reader component 404 to function at certain periods of time when a battery power level is below a threshold as well. In once example, the storage device 400 can include likely times during which historically or based on a schedule that an authorized user may desire to unlock the storage device 400. The data can include probabilities of when the storage device 400 may be opened. The control module 402 can progressively keep the electronic locking mechanism 404 and the associated reader component 404 operations starting with the most probable time frames when an authorized user might arrive. Thus, a controlled shutdown can occur which maintains the unlocking capability beyond other components that are shut down. The control module 402, as the battery power continues to be reduced, may shut down the electronic locking mechanism 404 and the associated reader component 404 during times with less probability of access being attempted.

In another aspect, if the normal operation of the system is to hold the locking mechanism 404 in the unlock position or state for a period of 5 seconds, then the battery saving algorithm or operation of the control module 402 can cause the locking mechanism 404 to be held in the unlock position for a shorter period of time. Thus, in a low battery mode based on a threshold value, the time in which the unlock position is held can be reduced to 2 or 3 seconds. Further, the period of time can be progressively shortened as well depending on the battery power level.

The control module 402 may also send out notifications to a central control system 252 or to previous users or current users on the authorization list about the battery power and a predicted loss of ability to unlock the storage device 400. In one aspect, the storage device 400 at a certain threshold or not could communicate with one or more individuals who are authorized to access the storage device 400 to schedule a time to unlock the storage device 400. The storage device 400 could then shut down the electronic locking mechanism 404 and the associated reader component 404 until the appointed time.

In yet another aspect, the system could include a port (such as USB port) that could be used by an authorized user to power the electronic locking mechanism 404 and the associated reader component 404. Thus, if the power was too low on the storage device 400, a user could use their own mobile device, or a portable battery, and plug into the storage device 400 to provide just enough power to operate the electronic locking mechanism 404 and the associated reader component 404. A wireless connection could also be used to provide power from a mobile device or battery to the electronic locking mechanism 404 and the associated reader component 404.

In one aspect, any communication protocol that enables two devices 400, 420 to communicate data with each other can be used. For example, a protocol similar to what is used with Google Pay or Apple Pay at a point of sale NFC device could be used to establish a short distance wireless communication between the mobile device 420 and the storage device 400.

In one aspect, a storage device can include a processor, a storage bin configured within the storage device, a battery that stores energy for operation of the storage device, a sensing component that determines a fullness level of the storage bin and an electronic locking mechanism that enables access to an interior portion of the device. A control module can have instructions (stored in a memory) which, when executed by the processor, manages the sensing component and is in communication with the electronic locking mechanism. A reader component can communicate with an external entity to obtain access authorization request information. The control module can allow or deny access to the device based on stored authorization allowances obtained from a remote server.

In one aspect, the storage device can unlock and remain unlocked in the event of a low battery condition. A threshold could be met where there is just sufficient energy in the battery to unlock the device before the battery goes dead or hits a threshold. The system could also switch to pure solar power where the unlocking mechanism is powered directly from a solar panel. For example, the storage device can operate the electronic locking mechanism directly via a solar panel in the event of battery failure or some other condition.

The external entity in one aspect may only unlock the device if the storage device is deemed ready for a collection. Whether the device is deemed "ready" for collection could be based on one or more of a timing of the day, a status of a storage bin (fullness level), a service level agreement, a payment schedule, a route or location of a collection truck, a pattern of previous collections, a machine-learning algorithm output, a battery level, a sunlight level, a future weather prediction, and so forth. A remote server may set the status of the storage device as in a mode for collection or not. The decision can also be made locally by the storage device.

In one aspect, the external entity will only be able unlock the device during specific hours of the day. The timing of when unlocking is possible can be managed by the control module and/or a remote server. A separate service compartment can also be provided to the storage device which can be accessible only to authorized external entities. The separate compartment may not provide access to an internal storage bin but to other items like envelopes or other items.

Figure 5:
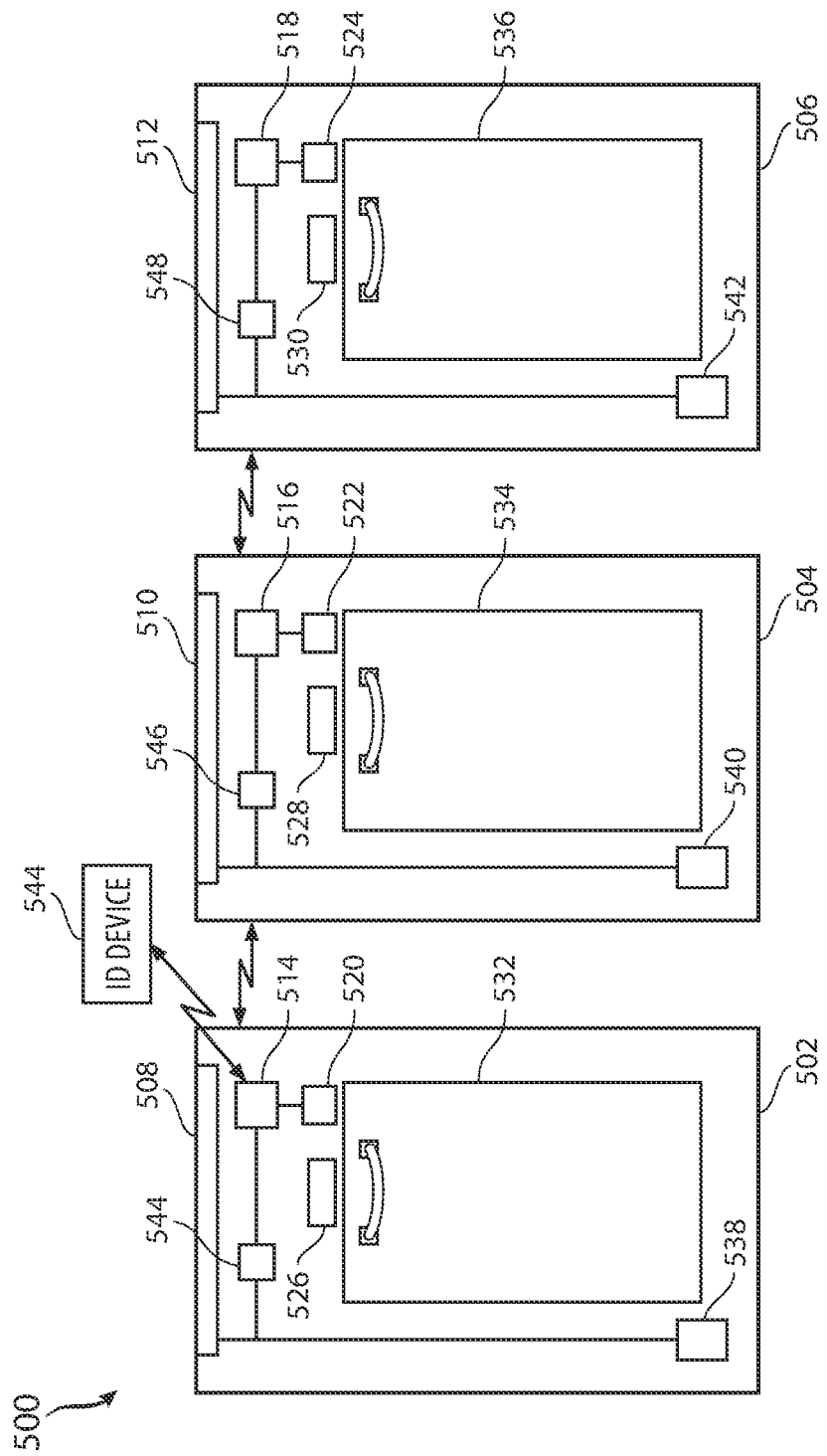
FIG. 5 illustrates a grouping of storage devices that coordinate locking functionality.

FIG. 5 illustrates a group 500 of storage devices 502, 504, 506 with a configuration that enables locking control to be shared or communicated between different devices. In one aspect, the number of storage devices can be two or more. Thus, while three are shown in FIG. 5, the number can be two, three, four, five, or more. In one example, a pair 502, 504 of storage devices can include a first storage device 502 having a first solar panel 508, a first battery 538 connected to the first solar panel 508, a first control module 546 powered by the first battery 538, a first compaction component (not shown in FIG. 5) controlled by the first control module 544 and powered by the first battery 538, a first locking mechanism 520 and a first reader component 514. The pair 502, 504 of storage devices can include a second storage device 504 having a second solar panel 510, a second battery 540 connected to the second solar panel 510, a second control module 546 powered by the second battery 540, a second compaction component (not shown) controlled by the second control module 546 and powered by the second battery 540, a second locking mechanism 522 and a second reader component 516. The storage devices 502, 504 can provide different functionality from the compaction of trash. In such a case, the storage devices 502, 504 may not include the compaction component.

The first control module 544 can be in communication with the second control module 546 via a wireless or a wired communication link. One of the first reader component 514 or the second reader component 516 can enable both the first locking mechanism 520 and/or the second locking mechanism 522. For example, a maintenance person can be at pair 502, 504 of storage devices and use an RFID card, mobile phone, key, or other external entity 544 to identify who they are at the first reader component 514 of the first storage device 502. The identification can be communicated from the first storage device 502 to the second storage device 504. The identification can be further communicated to the third storage device 506 or other devices as well. One or more listings of authorized individuals stored on one or more of the storage devices 502, 504, 506 can be accessed to enable any one of the respective locking mechanisms 520, 522, 524 to be unlocked based on the single interaction with one of the reader components 514, 516, 518. In this manner, for example, the person could be authorized on one storage device and unlock one or more of the storage devices 502, 504, 506 in the group with one access action. Other types of devices can also be coordinated together as well. For example, an authorization to access storage device 502 using reader component 514 could also be coordinated with a mailbox or traffic light control system to enable the user to unlock different containers or systems in connection with the storage device 502.

A wireless communication link can be used for communication between the first control module 544 and the second control module 546, as well as other control modules 548. In one aspect, the first reader component 514 and the second reader component 516, as well as other reader components 518, each can be one of an RFID reader, a near-field communication component, a Bluetooth reader component, a gesture sensing or detecting component, a facial recognition component, a bio-metric reader, a touch-sensitive display, a keypad, a multi-modal input component, a multi-modal input component, and a motion detection component. QR codes, near-field communication tags, or other devices can also be used in connection with a mobile device to gain access to the interior of a storage device 502, 504, 506.

The first control module 544 and the second control module 546 can store instructions to adjust a temporary period of time, based on a battery power level, that a door is unlocked. As the battery power level is reduced, the period of time that the door is unlocked can also be reduced as it takes power to hold the locking mechanism 520, 522, 524 in the unlocked position. In one aspect, the first control module 544 causes the first reader component 514 to function at certain periods of time when a battery power level is below a threshold. This also is another energy saving approach when the battery power level is low. One or more of these energy saving functions can be implemented. At least one of the first control module 544 and the second control module 546 can store a listing of authorized external entities that can unlock at least one of the first storage device 502 and the second storage device 504.

In one example, the group of storage devices 502, 504, 506 may all run on a single battery 538. In this case, a user may gain access or authorize themselves using storage device 504 and its reader component 516 but the system may then grant access or unlock the door 532 on storage device 502 since that is where the battery 538 is for the group of storage devices 502, 504, 506.

In a grouping scenario, the magnet concept is helpful where a user may cause two doors to be unlocked from two storage devices 502, 504 but the user is only there to remove trash from one storage device 502 and not recyclable material from another storage device 504. The recyclable storage device 504 may have its door 534 unlocked but the magnet 528 would maintain the door 534 in the closed position for safety and after a few seconds, say 5 seconds for example, the locking mechanism 522 would switch from the unlock state to the locked state.

In the scenario of two storage devices 502, 504 where the battery level is running low, the system may only unlock the storage device 502, 504 that needs servicing and not unlock the door on the other storage device. This will reduce the drain on the battery as holding the locking mechanism in the unlocked position takes battery power.

In another example, an embodiment can cover a pair of devices including a first device 502. The first device 502 can have both a reader component 514 and a control module 544 that controls both (1) a first operation of the first device 502 (such as a sensor control) and (2) a first locking component 520 of the first device 502 for accessing a first door 532 of the first device 502. A second device 504 can be in communication with the first device 502. The second device 504 can have a second locking component 522 for the second device for accessing a second door 534 of the second device 504. The second device in one aspect does not having a reader component or a control module that independently controls the second locking component. In this manner, a group of devices can be managed with respect to access control where only one device of the group needs the reader component and the control software. The devices can communicate with each other and provide instructions related to locking or unlocking. For example, one control module on one device might be programmed to provide authorization and instructions to a second device that has a control module configured to receive unlocking instructions. Access to the first device 502 and the second device 504 can both be controlled by use of the reader component 514 and the control module 544 on the first device 502 such that the first device 502 and the second device 504 can be unlocked simultaneously, one at a time, or individually based on access rules implemented by the control module.

The same principles can also apply to additional devices 506, etc., in which one (or more), but not all, of the devices can have the reader component and control module functionality and can thus be used to manage access to all of the devices in the group.

In another aspect, a pair of storage devices can include a first storage device 502 having a first battery 538 storing energy for operating the first storage device 502, a first control module 544 powered by the first battery 538, a first sensor component controlled by the first control module 544 and powered by the first battery 538, a first locking mechanism 520 and a first reader component 514. A second storage device 504 can include a second battery 540 storing energy for operating the second storage device 504, a second control module 546 powered by the second battery 540, a second sensor component controlled by the second control module 546 and powered by the second battery 540, a second locking mechanism 522 and a second reader component 516. The first control module 544 can be in communication with the second control module 546. One of the first reader component 514 or the second reader component 516 (If the second device 504 has such a component) enables both the first locking mechanism 520 and the second locking mechanism 522 to be controlled.

The first reader component 514 and the second reader component 516 can each include one of an RFID reader, a near-field communication component, a Bluetooth reader component, a gesture sensing or detecting component, a facial recognition component, a bio-metric reader, a touch-sensitive display, a keypad, a multi-modal input component, and a motion detection component. In one aspect, one of the first control module 544 and the second control module 546 can store additional instructions to adjust a temporary period of time, based on a battery power level, that a door is unlocked. The period of time for operation or to turn on the capability of unlocking the respective devices can also be provided based on a time of day, a battery level threshold, a collection schedule, a status or state of a respective device such that it is ready for collection (sensor indicated a full level) or in need of service. In one aspect, an external entity that interacts with the first reader component may only unlock the device during specific hours of a day, or only while it is light. Other examples of timing control can also be provided, such as after a large sales day or holiday.

At least one of the first control module 544 and the second control module 546 can store a listing of authorized external entities that can unlock at least one of the first storage device and the second storage device. The different devices can be unlocked independently, simultaneously, based on respective batter powers in the group of devices, upon request of a user, and so forth.

At least one of the first control module 544 and the second control module 546 can store (as received from a remote server) a listing of black-listed external entities that cannot unlock at least one of the first storage device 502 or the second storage device 504.

In one aspect, one of the first storage device and the second storage device can unlock and remain unlocked when a respective low battery condition exists. This enables service to be provided to the device such that it is not set in the lock position without any battery power to unlock the device.

An external entity can interact with the first reader component 514 and may only be able to unlock one of the first storage device 502 or the second storage device 504 if the first storage device 502 or the second storage device 504 is respectively deemed ready for a collection or needs service. The definition of "ready" can vary and having such meaning as a full level of a storage been as sensed by a sensor, or that a component indicates that it needs service or has stopped working. For example, a solar panel or a sensor may stop working and an action could be taken such as unlocking the door to enable service on the device.

In one aspect, one or more of the devices 502, 504, 506 can include a separate service compartment that is accessible only to authorized external entities. This separate compartment can store envelopes, paper, tools, electrical components, spare parts, or any other items. In another aspect, the first storage device 520 can operate the locking mechanism 520 directly off of a solar panel when battery failure occurs. In another aspect, power can be communicated from one device to another device to provide power to unlock the other device. Power can be transferred in a wired fashion or in a wireless fashion between devices as necessary.

Figure 6:
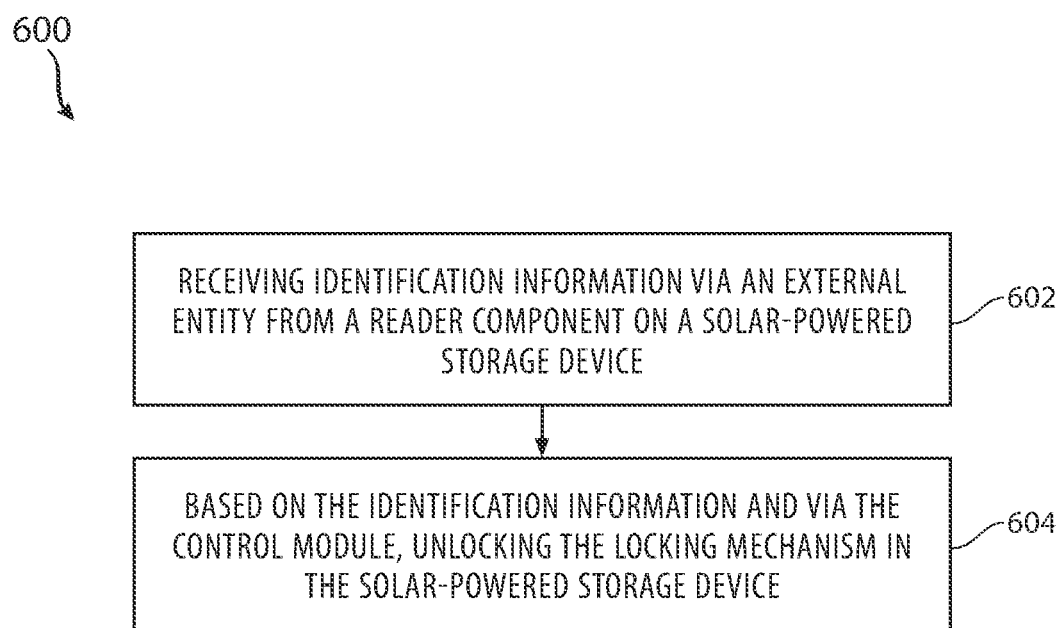
FIG. 6 illustrates a method embodiment.

FIG. 6 illustrates an example method 600. A method can include receiving identification information via an external entity from a reader component on a solar-powered or battery-powered storage device (602). The reader component can be connected to a control module that manages at least one component in the storage device such as a compaction component in the solar-powered compaction device. Further, the control module can control a locking mechanism. The method further can include, based on the identification information and via the control module, unlocking the locking mechanism in the solar-powered or battery-powered storage device (604).

In one aspect, the method or the system can include the concept where individual storage devices can receive their respective listings of authorized users. Then an entity can deliver RFID cards or enable mobile devices 268 to be authorized when they interact with the reader component 266. There can be an overlay of the devices 268 that is on top of the underlying system authorization process or listings that are downloaded and stored on individual devices. In another aspect, the system could be triggered based on the interaction of a mobile device 268 and the reader component 266 on the storage device 204 to cause a connection to be established between a mobile device 268 of the user and a remote server 252. Data regarding the identification of the user and of the particular storage device 204 can be transmitted to the remote server 252 and a wireless authorization can provided from the remote server to the storage device 204 or to the mobile device 268 to unlock the locking mechanism on the storage device 204.

In another aspect, the method can include any of the other functionality described herein, such as controlling the active status of a locking mechanism and/or a reader component based on battery level. Any concept, component, module or step can be used in connection with any other concept, component, module or step disclosed herein. Each embodiment or example is meant to be exemplary and not as a mutually exclusive embodiment.

Figure 7:
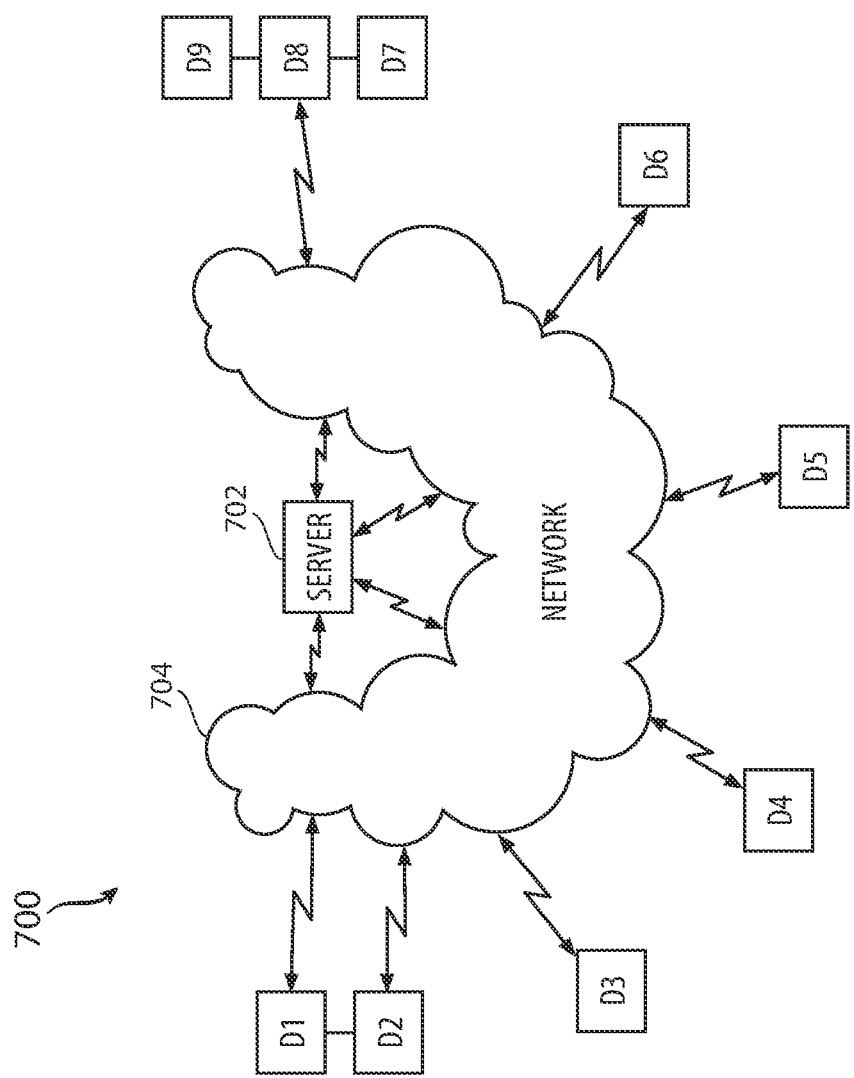
FIG. 7 illustrates a remote server communicating with one or more local devices.

FIG. 7 illustrates a network 700 having a remote or centralized server 702 that communication via a network 704 with one or more local devices D1, D2, D3, D4, D5, D6, D7, D8 and D9. The remote server 702 operates a software platform and control components that manage the locking and unlocking authorizations and functionality of one or more of the local devices D1-D9. The devices D1-D9 can be any of the types of devices disclosed herein and can include groupings as well. For example, a pair of devices D1-D2 can be co-located or grouped together such that one device, say D1, is a "dumb" device that does not have a reader component or the locking/unlocking management technology built into its local control module. Paired device D2 can communicate with D1. D2 can have the necessary reader component and control module that can include authorization lists or instructions received from the remote server 702 for managing authorizations to access one or both of D1 and D2. D7, D8 and D9 illustrate a group of three devices that are in communication with each other. The locking mechanisms on the respective devices can be independently controlled and reader component and a control module on one (or more) of the devices, for example D8, can be used to control opening all of the devices D7-D9 simultaneously, one at a time in sequence, or any one individually based on the access and authorization rules stored locally or accessed from the remote server 702.

The remote server 702 can further perform a number of different management functions with respect to authorizations and the lock control of respective devices D1-D9. In one example, the system can have "master keys" where if an external entity has a certain password or "magic" password programmed into it, the system will unlock the door without having that ID stored on the local access list. A password can be manually entered or provided in another modality. Such passwords will be reserved for super users like large service providers or company employees that need to access any station in a large geography or the world.

Master keys can be used further as follows. If a master key, password, or other entity operating to enable access to a user not specifically on an authorized user list, were to get into an unauthorized user's hand, it could then be used to open any device D1-D9. In order to combat this potential threat, the remote server 702 can transmit a locally stored "black list" that would prevent specific ID from accessing a station, even if it had the magic password. Thus, is a magic password were known to have been made public or been stolen, the system 702 can add that identification to a "black list" stored on the various devices D1-D9. In this manner, a master key, authorization lists, and black lists can all be used to control authorization procedures by local devices.

If a device D1-D9 loses communication with the remote server 702, it will not be able to update its authorized user list. In this scenario, the local control module can include functionality to enable any ID of any acceptable format, independent of specific ID information or confirmation of the user being on an authorized user list, to unlock the device. Thus, a maintenance person can open that station to perform service work to restore communication.

One aspect of the use of the remote server 702 or operations on local devices D1-D9 includes alerts. The system can provide multiple alerts to indicate error or misuse. For example, one alert can include "Electronic lock not responding to control module", "Too many card swipes", "Collection outside of scheduled hours" and so forth. These alerts can be based on detected events from local devices D1-D9. Any device can transmit an alert through the network 704 to the remote server 702. An alert can be transmitted to an external entity such as a mobile device used to seek access to a respective device.

Figure 8:
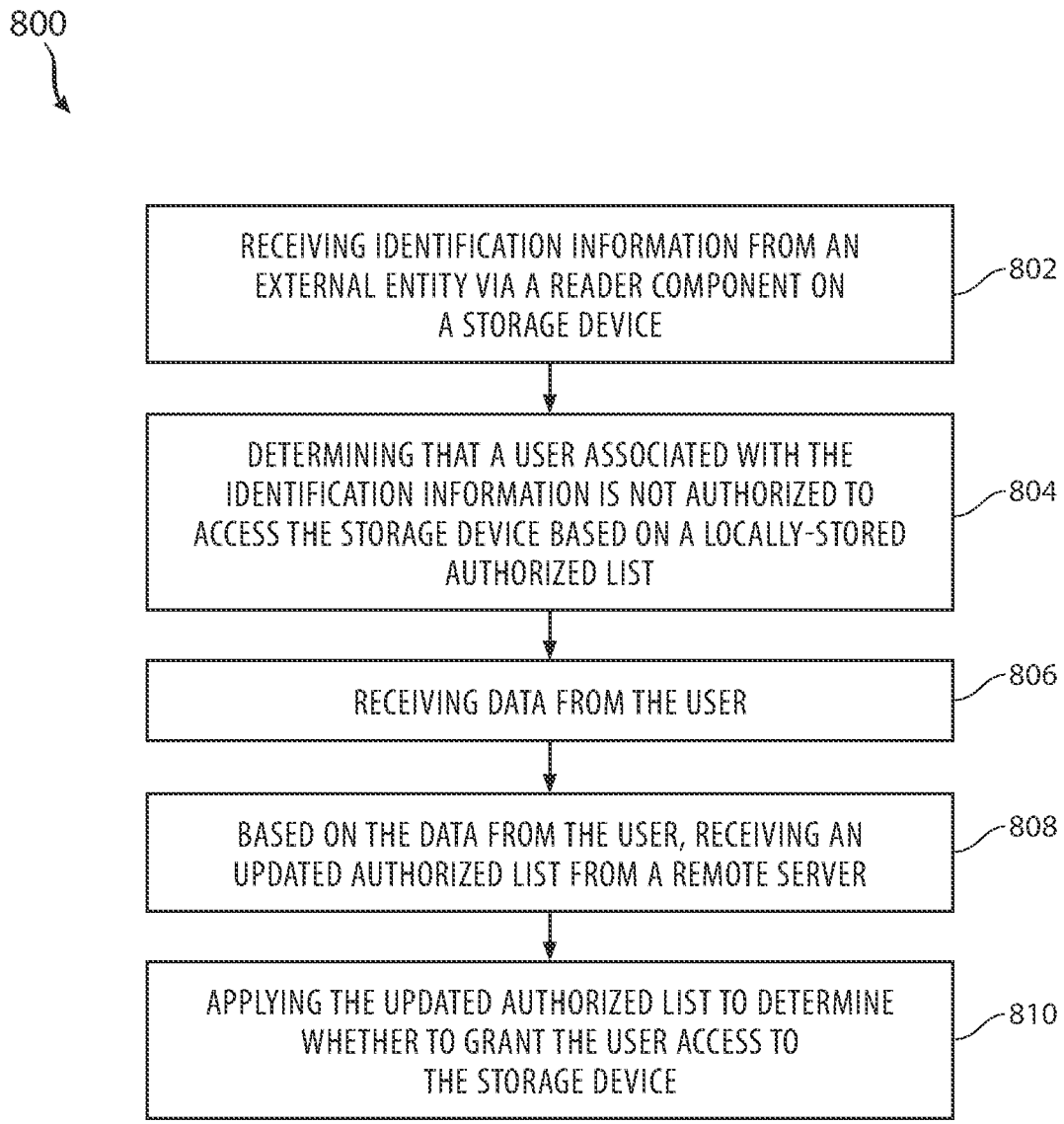
FIG. 8 illustrates another method embodiment.

Another aspect of the remote server 702 can be collection tracking. In one aspect, the server 702 can receive data from various devices D1-D9 and can count any door opening as a collection. Additional functionality can be provided however. With different external entity IDs, the system 702 can differentiate between a waste collector and someone performing service maintenance. By differentiating amongst different people opening up a device, and to have more accurate data on when collections or service events occurred, the system 702 can track who performed a collection or opening of the device and provide reports on one or more of the various types of openings, timing, how long the device was opened, whether a bin was emptied or some other task was performed, and so forth. FIG. 8 illustrates a method embodiment 800. This method relates to functions for enabling a user to force a storage device to request and receive from a remote server 702 an updated authorization list for access to the device. The method can include one or more of receiving identification information from an external entity via a reader component on a storage device (802), wherein the reader component is connected to a control module that manages at least one component in the in the storage device and wherein the control module also controls a locking mechanism that controls access to the storage device. The method includes determining that a user associated with the identification information is not authorized to access the storage device based on a locally-stored authorized list (804), receiving data from the user (806), based on the data from the user, receiving an updated authorized list from a remote server (808) and applying the updated authorized list to determine whether to grant the user access to the storage device (810).

The data from the user can include one or more of the identification information, a combination of the identification information and a second type of input, a single-mode input and a multi-modal input. The second type of input can include by way of example a magnet input to a sensor on the storage device. Thus, if a user is not authorized to unlock a device, the user can provide their User ID via the external entity while at the time or in succession can hover a magnet over a sensor component on the device. The two inputs can cause an operation to be implemented which forces the device to request and receive from a remote server 702 an updated authorized user list. The device could then apply the new list automatically based on the previous receipt of the ID, or can require the user again to provide their user ID to test against the updated authorization user list. Asking for an updated list can also be an option presented on a touch-sensitive screen in which the user interacts with an object such as a button to request the updated list.

Figure 9:
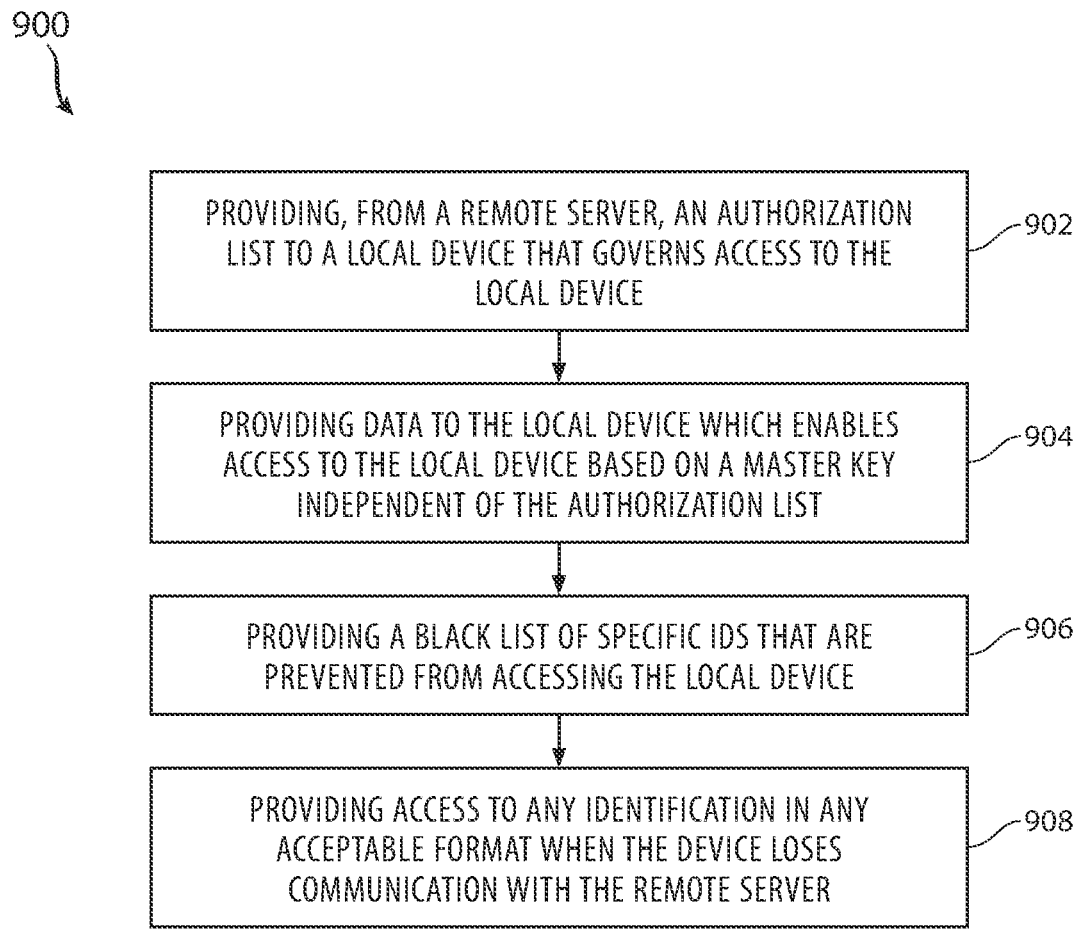
FIG. 9 illustrates yet another method embodiment.

FIG. 9 illustrates another method embodiment 900 related to the use of master keys. The method includes providing, from a remote server, an authorization list to a local device that governs access to the local device (902) and providing data to the local device which enables access to the local device based on a master key independent of the authorization list (904). Other steps can include providing a black list of specific IDs that are prevented from accessing the local device (906) and providing access to any identification in any acceptable format when the device loses communication with the remote server (908).

Figure 10:
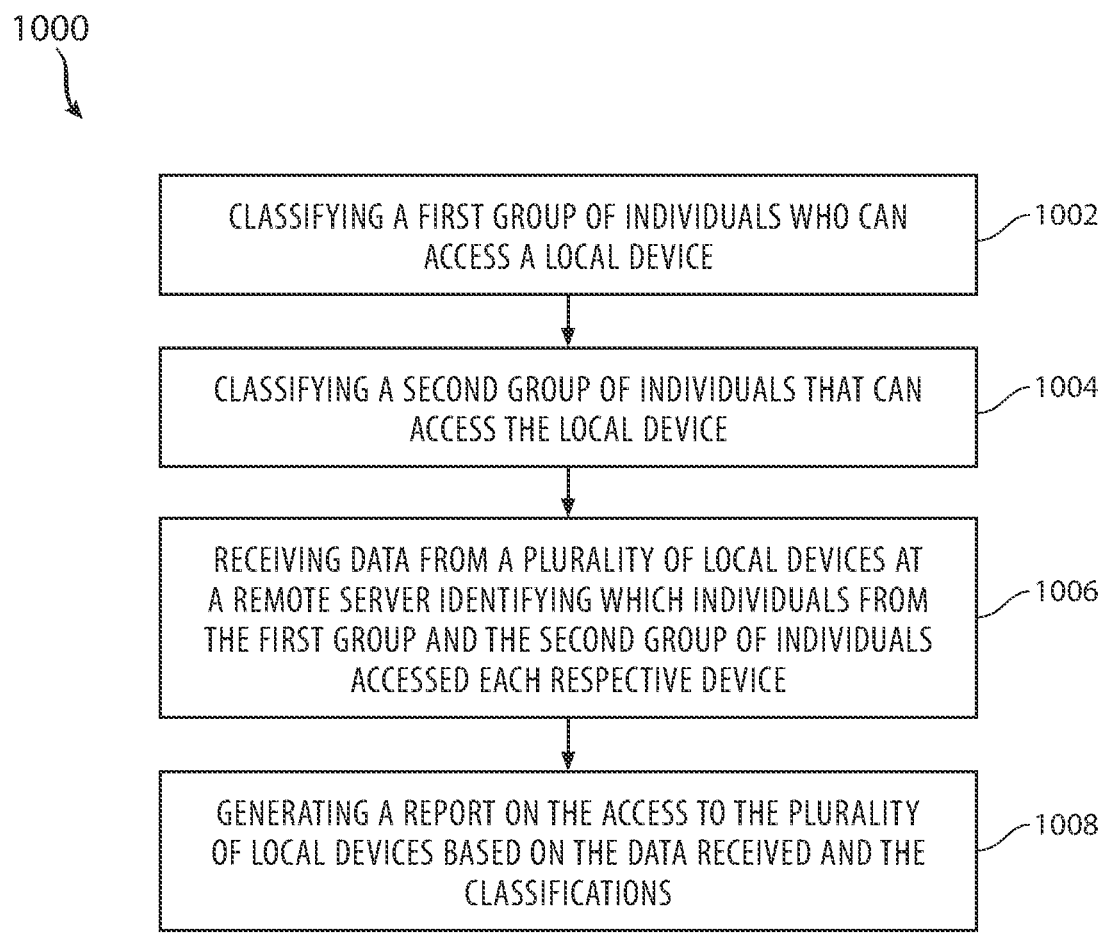
FIG. 10 illustrates another method embodiment.

FIG. 10 illustrates a method 1000 associated with the collection of data in a configuration like that shown in FIG. 7. The method includes classifying a first group of individuals who can access a local device (1002) and classifying a second group of individuals that can access the local device (1004). For example, one group can be waste collectors and another group can provide mechanical service to the units. The method can include receiving data from a plurality of local devices at a remote server identifying which individuals from the first group and the second group of individuals accessed each respective device (1006) and generating a report on the access to the plurality of local devices based on the data received and the classifications (1008). As noted above, the data that can be reported on can include many different types of data associated with accessing the various devices. For example, one or more of the following factors can be applied to the analysis or reporting: the person who accessed each device, the type of access, sensor data before and after the access, a time of day, how long the device was unlocked, a time between a notice going out to a person and when the person arrived and unlocked a device, and so forth.

Figure 11:
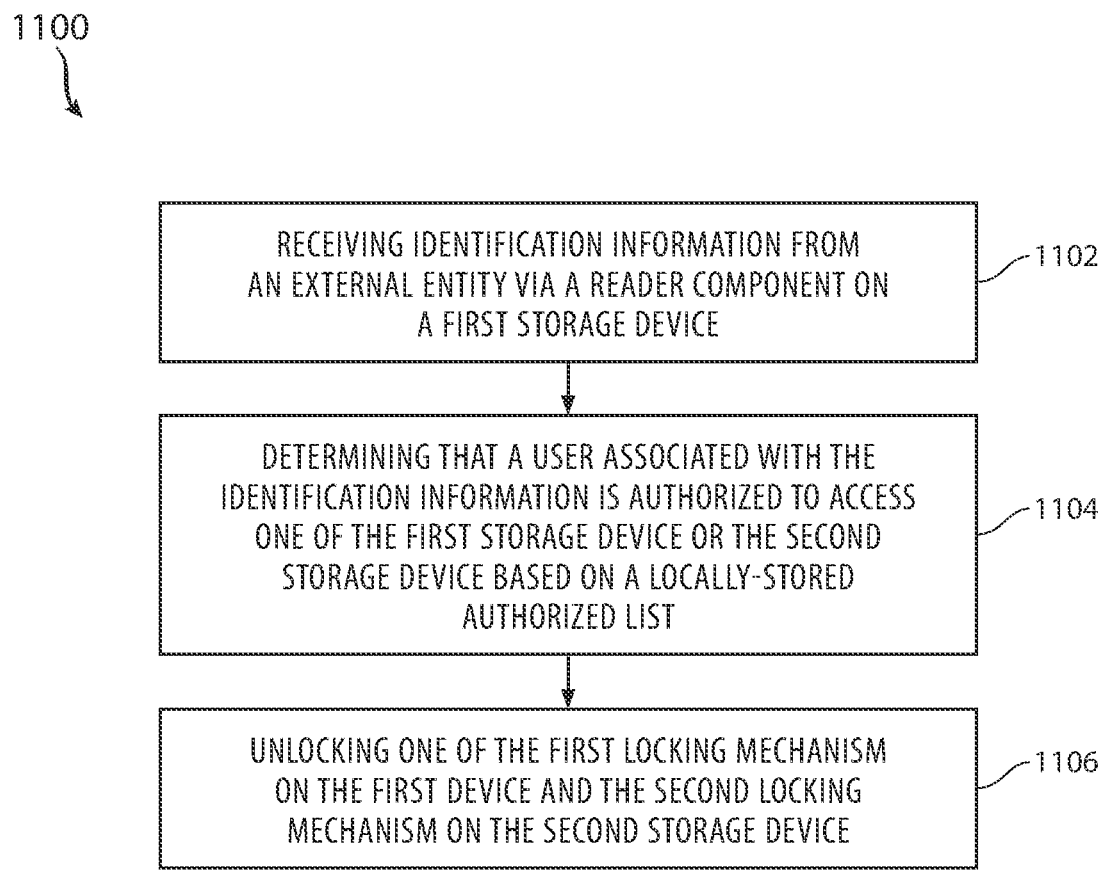
FIG. 11 illustrates a method embodiment related to a pair of devices.

FIG. 11 illustrates a method 1100 that relates to managing the locking operations for a group of devices. The method can include receiving identification information from an external entity via a reader component on a first storage device (1102). The reader component can be connected to a control module that manages at least one component in the in the first storage device. The control module can also control a first locking mechanism that controls access to the first storage device and a second locking mechanism configured on a second storage device, the second locking mechanisms controlling access to the second storage device.

The method can include determining that a user associated with the identification information is authorized to access one of the first storage device or the second storage device based on a locally-stored authorized list (1104) and unlocking one of the first locking mechanism on the first device and the second locking mechanism on the second storage device (1106). When it is the second locking mechanism that is unlocked, the unlocking can be based on a signal transmitted from the first storage device to the second storage device.

In one aspect, the second storage device does not include a second-device reader component. The locally-stored authorization list can be stored at the first storage device and the locally-stored authorization list can provide authorization information on one or more of a per-device, per user, per group of devices, per time, or per unlocking need basis. The control modules for the different devices may be different as one may include commands and another control module may only be configured to receive unlocking instructions from the other device.

The locally-stored authorization list further can define timing information regarding when at least one of the first storage device and the second storage device are eligible to be unlocked. The control module can store access rules and control instructions that can cause the first locking mechanism and/or the second locking mechanism to open simultaneously, independently, at a certain time, based on a specific event or parameter, or in a sequence. The method can further include registering the second storage device with the first storage device to enable management of the second locking mechanism by the control module of the first storage device.

Figure 12:
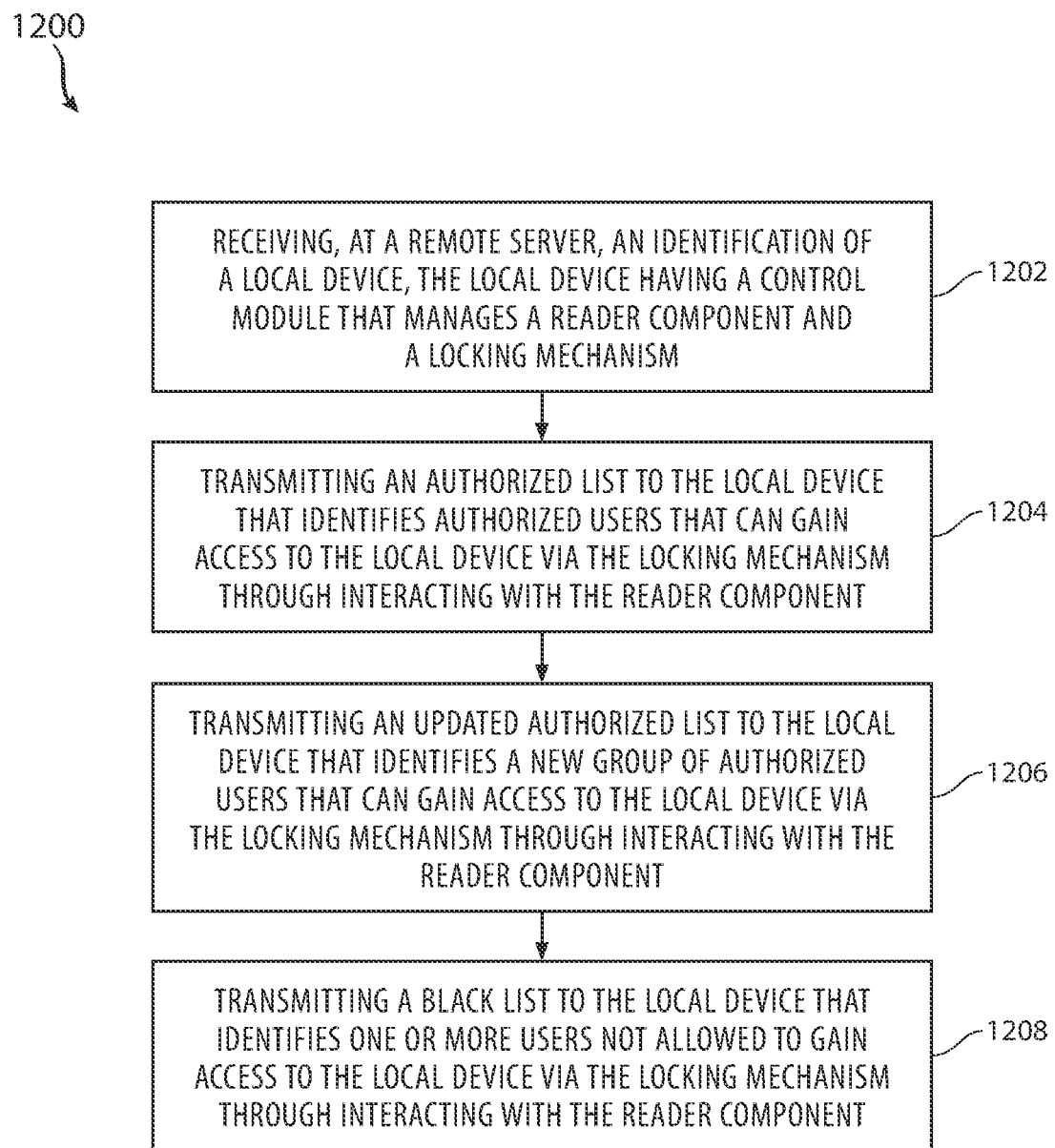
FIG. 12 illustrates a method related to remote server control of locking operations of devices.

FIG. 12 illustrates an example method 1200 related to using a remote server to manage a group of or a plurality of local devices. A method includes receiving, at a remote server, an identification of a local device, the local device having a control module that manages a reader component and a locking mechanism (1202) and transmitting an authorized list to the local device that identifies authorized users that can gain access to the local device via the locking mechanism through interacting with the reader component (1204). The control module on the local device can manage multiple functions of the local device including management of the reader component and the locking mechanism.

Upon triggering the locking mechanism, the control module of the local device can maintain the locking mechanism in an unlock position for a predetermined period of time, after which the unlock position changes to a lock position. In one aspect, when the reader component of the local device communicates with an external entity to obtain authorization to unlock the local device, the control module can obtain identification data associated with the external entity and report at least the identification data to the remote server.

The method can further include transmitting an updated authorized list to the local device that identifies a new group of authorized users that can gain access to the local device via the locking mechanism through interacting with the reader component (1206). In another aspect, the method can also include transmitting a black list to the local device that identifies one or more users not allowed to gain access to the local device via the locking mechanism through interacting with the reader component (1208).

The authorized list can define access control data for both the local device and a second local device in communication with the local device. Other devices can be covered as well such that the group can consist of three or more devices.

The method can also include transmitting a master key list to the local device, the master key list defining super users who can gain access to the local device independent of being listed on the authorized list. This can cover a maintenance person perhaps from the manufacturer of the storage devices or other person who needs access who might not specifically be on the authorized list. In yet another example, the remote server may receive a request for an updated access list and respond by transmitting an updated access list to the local device from which the request came.

Figure 13:
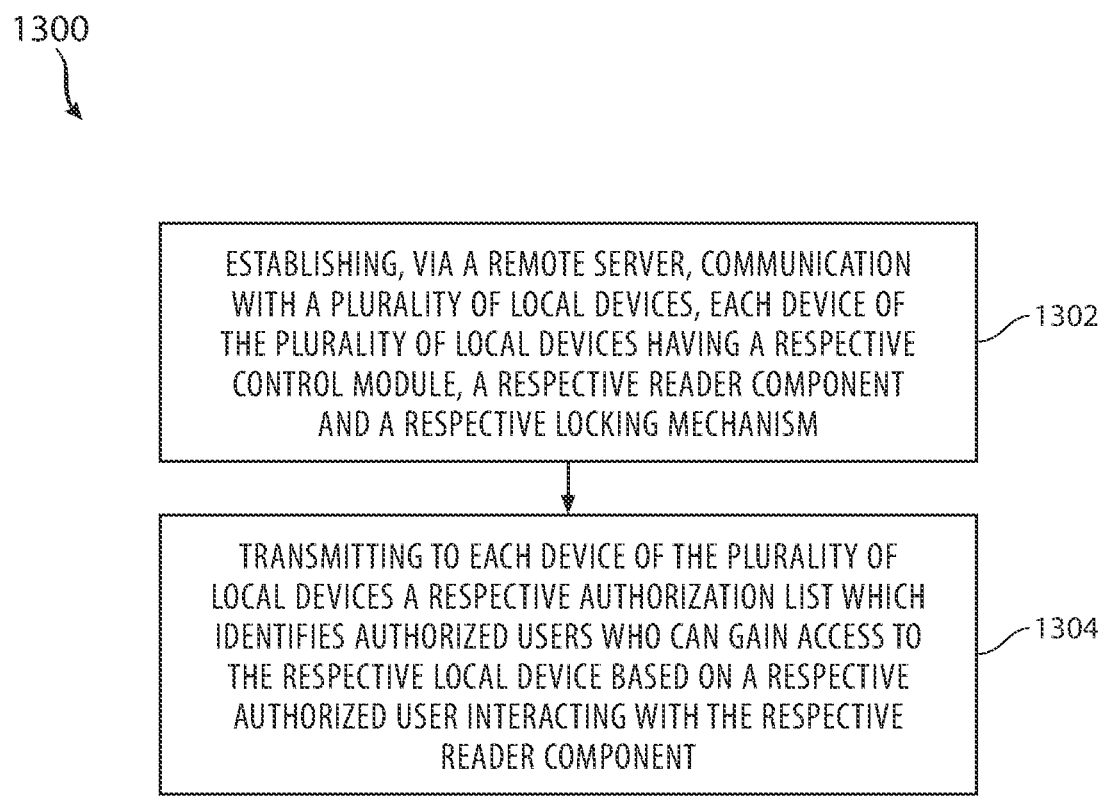
FIG. 13 illustrates another method of using a remote server to manage locking operations for one or more devices.

FIG. 13 illustrates another method embodiment 1300. A method includes establishing, via a remote server, communication with a plurality of local devices, each device of the plurality of local devices having a respective control module, a respective reader component and a respective locking mechanism (1302) and transmitting to each device of the plurality of local devices a respective authorization list which identifies authorized users who can gain access to the respective local device based on a respective authorized user interacting with the respective reader component (1304). The respective control module can cause the respective locking mechanism to unlock upon authorization locally based on the respective authorization list.

As introduced in FIG. 1 above, some of the component can be electrical or computer components. In some cases, such a computing device or apparatus may include a processor, microprocessor, microcomputer, or other component of a device that is configured to carry out the steps of the methods disclosed above. In some examples, such computing device or apparatus may include one or more antennas for sending and receiving RF signals. In some examples, such computing device or apparatus may include an antenna and a modem for sending, receiving, modulating, and demodulating RF signals, as previously described.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The methods discussed above are illustrated as a logical flow diagram, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the methods disclosed herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but can have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

We claim:

1. A system comprising:
   a processor; and
   a computer-readable storage device storing instructions which, when executed by the processor, cause the processor to perform operations comprising:
      receiving an identification of a first local device having a control module that manages a reader component and a first locking mechanism configured on the first local device; and
      transmitting an authorized list to the first local device that identifies authorized users that can gain access to the first local device via the first locking mechanism through interacting with the reader component, wherein the control module on the first local device manages multiple functions of the first local device including management of the reader component and the first locking mechanism, wherein the authorized list defines access control data for both the first local device and a second local device in communication with the first local device, the second local device having a second locking mechanism.

2. The system of claim 1, wherein the reader component of the first local device comprises one of an RFID reader, a near-field communication component, a Bluetooth reader component, a gesture sensing or detecting component, a facial recognition component, a bio-metric reader, a touch-sensitive display, a keypad, a multi-modal input component, and a motion detection component.

3. The system of claim 1, wherein upon triggering the first locking mechanism, the control module of the first local device maintains the first locking mechanism in an unlock position for a predetermined period of time, after which the unlock position changes to a lock position.

4. The system of claim 1, wherein when the reader component of the first local device communicates with an external entity to obtain authorization to unlock the first local device, the control module obtains identification data associated with the external entity and reports at least the identification data to the system.

5. The system of claim 1, wherein the computer-readable storage device stores additional instructions which, when executed by the processor, cause the processor to perform operations further comprising:
   transmitting an updated authorized list to the first local device that identifies a new group of authorized users that can gain access to the first local device via the first locking mechanism through interacting with the reader component.

6. The system of claim 1, wherein the computer-readable storage device stores additional instructions which, when executed by the processor, cause the processor to perform operations further comprising:
   transmitting a black list to the first local device that identifies one or more users not allowed to gain access to the first local device via the first locking mechanism through interacting with the reader component.

7. The system of claim 1, wherein the first local device and the second local device are adjacent to each other.

8. The system of claim 1, wherein the second local device does not store the authorized list nor does it include a second-device reader component.

9. The system of claim 1, wherein the computer-readable storage device stores additional instructions which, when executed by the processor, cause the processor to perform operations further comprising:
   transmitting a master key list to the first local device, the master key list defining super users who can gain access to the first local device independent of being listed on the authorized list.

10. The system of claim 1, wherein the computer-readable storage device stores additional instructions which, when executed by the processor, cause the processor to perform operations further comprising:
    receiving door opening data from the first local device, wherein the door opening data comprises one or more of: an indication of a door being opened on the first local device, an identification of a type of access to the first local device, and an identification of a user who accessed the first local device.

11. The system of claim 10, wherein the computer-readable storage device stores additional instructions which, when executed by the processor, cause the processor to perform operations further comprising:
    correlating the door opening data to yield correlated data; and
    reporting the correlated data.

12. The system of claim 1, wherein an external entity interacts with the reader component and can be authorized to unlock the first local device on one or more of an individual station level, a group of stations level, a customer level, an individual server person level, or a multiple customer level.

13. The system of claim 1, wherein the control module stores instructions to adjust a temporary period of time, based on a battery power level, that a door is unlocked upon triggering the first locking mechanism.

14. A method comprising:
    receiving, at a remote server, an identification of a first local device, the first local device having a control module that manages a reader component and a first locking mechanism; and
    transmitting an authorized list to the first local device that identifies authorized users that can gain access to the first local device via the first locking mechanism through interacting with the reader component, wherein the control module on the first local device manages multiple functions of the first local device including management of the reader component and the first locking mechanism, wherein the authorized list defines access control data for both the first local device and a second local device in communication with the first local device, the second local device having a second locking mechanism.

15. The method of claim 14, wherein the reader component of the first local device comprises one of an RFID reader, a near-field communication component, a Bluetooth reader component, a gesture sensing or detecting component, a facial recognition component, a bio-metric reader, a touch-sensitive display, a keypad, a multi-modal input component, and a motion detection component.

16. The method of claim 14, wherein upon triggering the first locking mechanism, the control module of the first local device maintains the first locking mechanism in an unlock position for a predetermined period of time, after which the unlock position changes to a lock position.

17. The method of claim 14, wherein when the reader component of the first local device communicates with an external entity to obtain authorization to unlock the first local device, the control module obtains identification data associated with the external entity and reports at least the identification data to the remote server.

18. The method of claim 14, further comprising:
transmitting an updated authorized list to the first local device that identifies a new group of authorized users that can gain access to the first local device via the first locking mechanism through interacting with the reader component.

19. The method of claim 14, further comprising:
transmitting a black list to the first local device that identifies one or more users not allowed to gain access to the first local device via the first locking mechanism through interacting with the reader component.

20. The method of claim 14, wherein the first local device and the second local device are adjacent to each other.

21. The method of claim 14, further comprising:
transmitting a master key list to the first local device, the master key list defining super users who can gain access to the first local device independent of being listed on the authorized list.

22. A method comprising:
establishing, via a remote server, communication with a plurality of local devices, each respective local device of the plurality of local devices having a respective control module, a respective reader component and a respective locking mechanism;

transmitting to each device of the plurality of local devices a respective authorization list which identifies authorized users who can gain access to the respective local device based on a respective authorized user interacting with the respective reader component, wherein the respective control module will cause the respective locking mechanism to unlock upon authorization locally based on the respective authorization list; and receiving an alert at the remote server from one of the plurality of local devices, the alert being associated with an error of the one of the plurality of local devices with respect to one or more of a functionality of the respective reader component and a functionality of the respective locking mechanism.

* * * * *